(12) United States Patent
Takahashi

(10) Patent No.: US 9,753,837 B2
(45) Date of Patent: Sep. 5, 2017

(54) APPLICATION MANAGEMENT SYSTEM, MANAGEMENT APPARATUS, APPLICATION EXECUTION TERMINAL, APPLICATION MANAGEMENT METHOD, APPLICATION EXECUTION TERMINAL CONTROL METHOD, AND STORAGE MEDIUM

(71) Applicant: CANON KABUSHIKI KAISHA, Tokyo (JP)

(72) Inventor: Kentaro Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 14/018,196

(22) Filed: Sep. 4, 2013

(65) Prior Publication Data

US 2014/0075244 A1   Mar. 13, 2014

(30) Foreign Application Priority Data

Sep. 7, 2012  (JP) ................................. 2012-197267

(51) Int. Cl.
*G06F 11/36* (2006.01)
*G06F 11/07* (2006.01)

(52) U.S. Cl.
CPC ........ *G06F 11/3668* (2013.01); *G06F 11/079* (2013.01); *G06F 11/0736* (2013.01)

(58) Field of Classification Search
USPC ........................................................ 714/38.1
See application file for complete search history.

(56) References Cited

U.S. PATENT DOCUMENTS

| 7,490,073 | B1* | 2/2009 | Qureshi et al. ................. 706/50 |
| 8,887,230 | B2* | 11/2014 | Barton et al. ..................... 726/1 |
| 8,904,477 | B2* | 12/2014 | Barton et al. ..................... 726/1 |
| 2004/0153692 | A1* | 8/2004 | O'Brien et al. ................. 714/4 |
| 2009/0013317 | A1* | 1/2009 | Abfalter et al. ............. 717/170 |
| 2010/0125749 | A1* | 5/2010 | Tanaka et al. .................... 714/4 |
| 2010/0332919 | A1* | 12/2010 | Ito et al. ......................... 714/57 |
| 2011/0197099 | A1* | 8/2011 | Mahajan et al. ................ 714/48 |

(Continued)

FOREIGN PATENT DOCUMENTS

| JP | 11-232223 A | 8/1999 |
| JP | 2002-14880 A | 1/2002 |

(Continued)

*Primary Examiner* — Kamini Patel
(74) *Attorney, Agent, or Firm* — Canon U.S.A., Inc. IP Division

(57) ABSTRACT

A management apparatus, based on received error information of applications and information of applications installed in a terminal being managed by the management apparatus, determines a condition that an application causes the error, send information indicating that the application satisfies the condition for causing the error to an terminal satisfying the error condition out of a plurality of terminals. An application execution terminal receives from the management apparatus the information indicating that the condition that the application causes an error is satisfied, and inhibits the execution of the application causing the error by changing a display form of the corresponding application or by displaying a message at the time of the activation of the application.

18 Claims, 25 Drawing Sheets

(56) References Cited

U.S. PATENT DOCUMENTS

2012/0291102 A1* 11/2012 Cohen .............................. 726/4
2012/0291103 A1* 11/2012 Cohen .............................. 726/4
2013/0042232 A1*  2/2013 Hirokawa ..................... 717/174

FOREIGN PATENT DOCUMENTS

| JP | 2002-49434 A  | 2/2002 |
| JP | 2004-5254 A   | 1/2004 |
| JP | 2006-243911 A | 9/2006 |

* cited by examiner

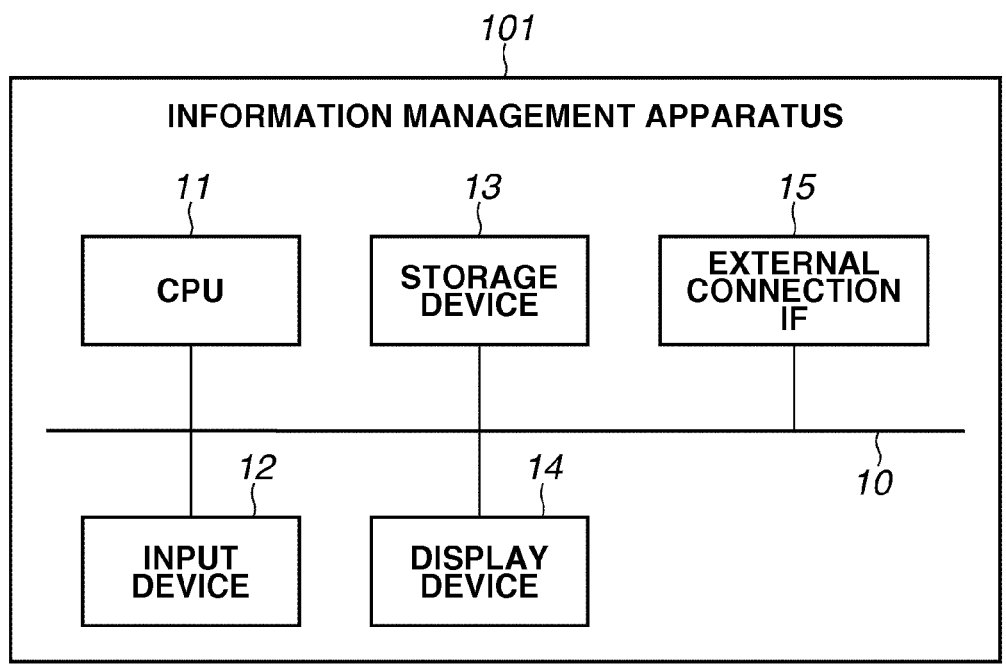
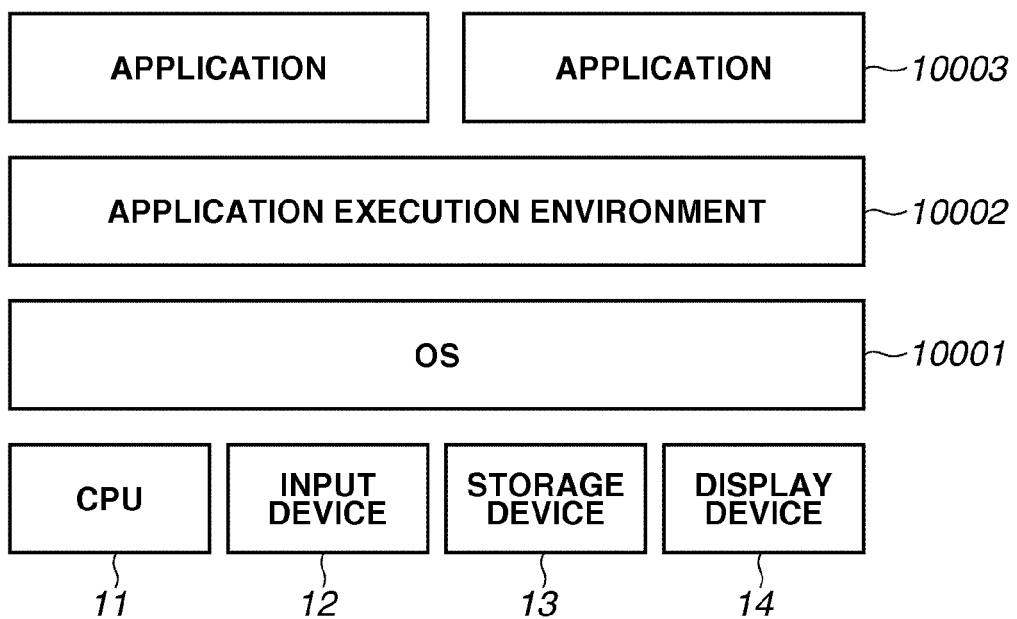

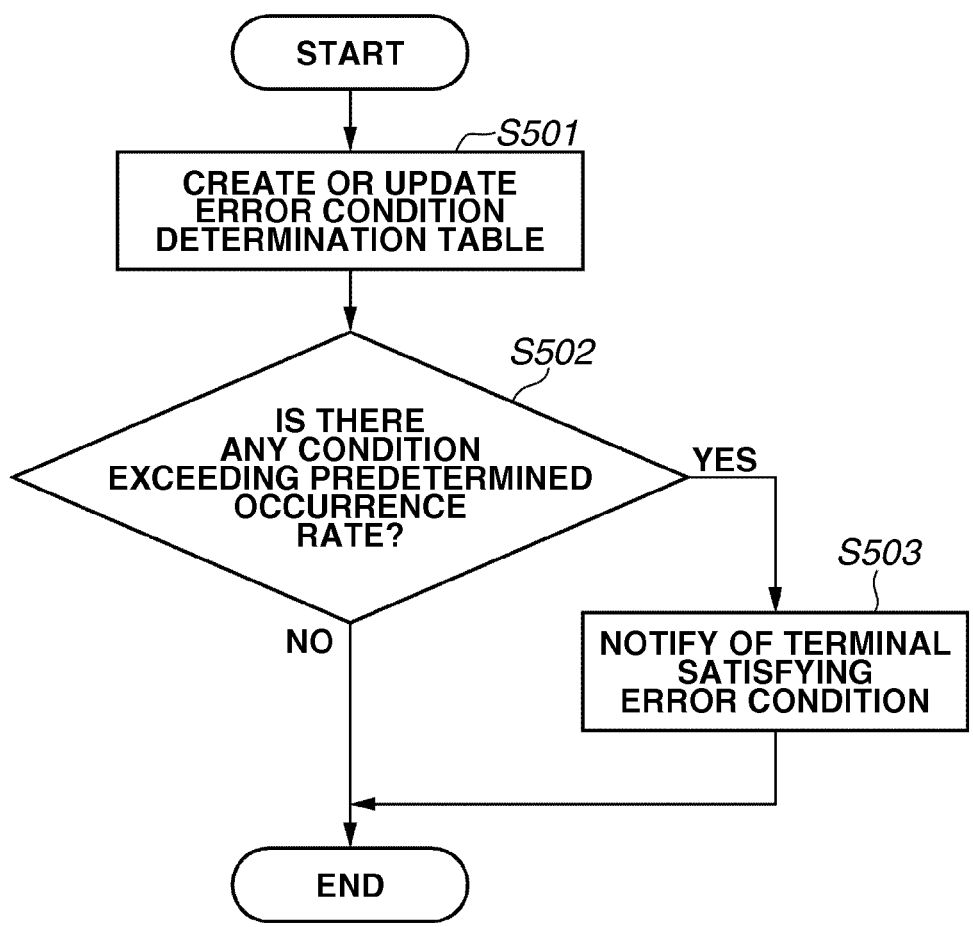

| APPLICATION ID | APPLICATION VERSION | TERMINAL MODEL NAME | TERMINAL VERSION | TERMINAL ID | ERROR MESSAGE |
|---|---|---|---|---|---|
| AppID_1 | 1.0 | Device_X | 1 | ID_1 | ErrorMessage1 |
| AppID_2 | 1.0 | Device_Y | 1 | ID_2 | ErrorMessage2 |
| AppID_1 | 1.0 | Device_X | 1 | ID_10 | ErrorMessage1 |

| APPLICATION ID AppID_1 | Device_X | Device_Y |
|---|---|---|
| THE NUMBER OF INSTALLED TERMINALS | 100 | 100 |
| THE NUMBER OF TERMINALS IN WHICH ERROR OCCURRED | 50 | 5 |

FIG.12A

| APPLICATION ID AppID_1 APPLICATION VERSION 1.0 | MODEL NAME Device_X TERMINAL VERSION 1 | MODEL NAME Device_X TERMINAL VERSION 2 | MODEL NAME Device_Y TERMINAL VERSION 1 |
|---|---|---|---|
| THE NUMBER OF INSTALLED TERMINALS | 20 | 25 | 50 |
| THE NUMBER OF TERMINALS IN WHICH ERROR OCCURRED | 0 | 0 | 40 |

| APPLICATION ID AppID_1 APPLICATION VERSION 2.0 | MODEL NAME Device_X TERMINAL VERSION 1 | MODEL NAME Device_X TERMINAL VERSION 2 | MODEL NAME Device_Y TERMINAL VERSION 1 |
|---|---|---|---|
| THE NUMBER OF INSTALLED TERMINALS | 50 | 5 | 50 |
| THE NUMBER OF TERMINALS IN WHICH ERROR OCCURRED | 0 | 5 | 10 |

| APPLICATION ID | APPLICATION VERSION | TERMINAL MODEL NAME | TERMINAL VERSION | TERMINAL ID | ERROR MESSAGE | TERMINAL INFORMATION AT ERROR OCCURRENCE |
|---|---|---|---|---|---|---|
| AppID_1 | 1.0 | Device_X | 1 | ID_1 | ErrorMessage1 | AppID_10, v1 |
| AppID_1 | 1.0 | Device_X | 1 | ID_2 | ErrorMessage2 | AppID_20, v1<br>AppID_10, v1 |
| AppID_1 | 1.0 | Device_X | 1 | ID_3 | ErrorMessage1 | AppID_30, v1<br>AppID_10, v1 |

FIG.13B 1302

| | Device_X INSTALLED APPLICATION ONLY A | Device_X INSTALLED APPLICATION A AND B | Device_X INSTALLED APPLICATION A AND C |
|---|---|---|---|
| THE NUMBER OF TERMINALS (Device_X) IN WHICH ERROR HAS OCCURRED, IN THE TERMINALS, APPLICATION A HAS BEEN INSTALLED | | | |
| THE NUMBER OF INSTALLED TERMINALS | 100 | 100 | 100 |
| THE NUMBER OF TERMINALS IN WHICH ERROR OCCURRED | 0 | 0 | 50 |

FIG.14A

| APPLICATION ID | APPLICATION VERSION | TERMINAL MODEL NAME | TERMINAL VERSION | TERMINAL ID | ERROR MESSAGE |
|---|---|---|---|---|---|
| AppID_1 | 1.0 | Device_X | 1 | ID_1 | ErrorMessage1 |
| AppID_1 | 1.0 | Device_Y | 1 | ID_2 | ErrorMessage2 |
| AppID_1 | 1.0 | Device_X | 1 | ID_3 | ErrorMessage1 |

| APPLICATION A | Device_X | Device_Y |
|---|---|---|
| THE NUMBER OF TIMES OF EXECUTION | 1000 | 1000 |
| THE NUMBER OF ERRORS | 500 | 50 |

1402

FIG.20A
| NORMAL ICON | SMOKE EFFECT | FLAME EFFECT | BRIGHTNESS REDUCTION | TIP |
|---|---|---|---|---|
|  |  |  |  |  |
FIG.20B
| TERMINAL ID | TERMINAL MODEL NAME | TERMINAL VERSION |
|---|---|---|
| ID_1 | Device_X | 1 |
FIG.20C
| APPLICATION IDENTIFICATION INFORMATION | TERMINAL ID |
|---|---|
| APPLICATION ID AppID_1 APPLICATION VERSION 1.0 | ID_1 |
| APPLICATION ID AppID_1 APPLICATION VERSION 1.0 | ID_2 |
| APPLICATION ID AppID_2 APPLICATION VERSION 1.0 | ID_1 |

FIG.21

| APPLICATION IDENTIFICATION INFORMATION | TERMINAL ID | THE NUMBER OF TIMES OF EXECUTION |
|---|---|---|
| APPLICATION ID AppID_1 APPLICATION VERSION 1.0 | ID_1 | 10 |
| APPLICATION ID AppID_2 APPLICATION VERSION 1.0 | ID_2 | 3 |
| APPLICATION ID AppID_2 APPLICATION VERSION 1.0 | ID_1 | 5 |

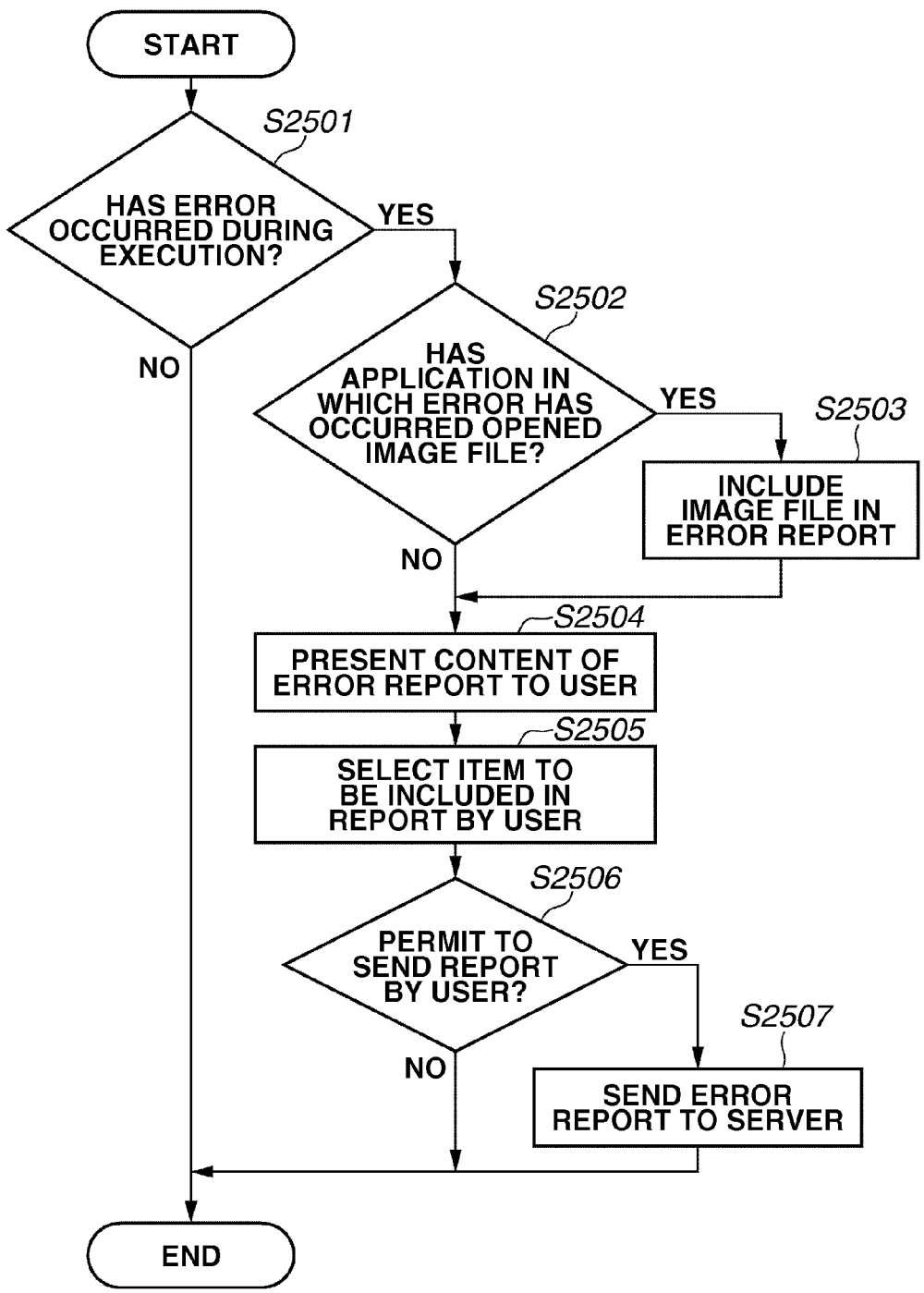

APPLICATION MANAGEMENT SYSTEM, MANAGEMENT APPARATUS, APPLICATION EXECUTION TERMINAL, APPLICATION MANAGEMENT METHOD, APPLICATION EXECUTION TERMINAL CONTROL METHOD, AND STORAGE MEDIUM

BACKGROUND OF THE INVENTION

Field of the Invention

The present invention relates to a system, an apparatus, a method, and a storage medium for inhibiting execution of an application on a terminal.

Description of the Related Art

Failures (market failures) of a released application are found by user calling to a call center of the provider (developer) of the application, or by other means when users run into trouble. In the methods for collecting the failure information, a method of causing an error detection program to operate on an application execution terminal and notifying a server of an error occurred has become prevalent. The provider of the application, based on the collected failure information, notifies the users of the application causing the failures. Further, to inhibit the market failures, the provider may newly develop an application taking measures against the failures.

One of the methods for reducing the market failures is to notify the users of the collected failure information. The methods of notifying the users of the collected failure information includes a known method in which individual terminals access information managed in a server via a network, and change graphics of an icon corresponding to the obtained information (for example, see Japanese Patent Application Laid-Open No. 11-232223). The methods also include a known method in which a server notifies a terminal related to a terminal in which an error has occurred (for example, see Japanese Patent Application Laid-Open No. 2002-14880).

More advanced methods for reducing the market failures include a method for controlling installation or execution of an application causing failures. In a known method, at the time of installation of a terminal, a server determines whether to permit to install an application, and based on the determination result, the terminal performs the installation (for example, see Japanese Patent Application Laid-Open No. 2002-49434). In another method, a serviceman of a multifunction peripheral (MFP) reports information, for example, information of occurrence of a failure in printing in a model with A4-sized sheets stapling in landscape orientation, and manually makes a trouble dictionary in a server. Print setting software checks whether print settings instructed by a user prior to the printing include a failure occurrence condition, and if the software determines that the settings may cause a failure, notifies the user using a dialog (for example, see Japanese Patent Application Laid-Open No. 2006-243911). In another known method, an operation at the time of icon click is changed depending on an installation state of an application (for example, see Japanese Patent Application Laid-Open No. 2004-5254).

In the method in Japanese Patent Application Laid-Open No. 11-232223, depending on the data on the server, all terminals change the graphics of the icon. However, the operation at the icon click is not changed.

In the method in Japanese Patent Application Laid-Open No. 2002-14880, an error occurred in a terminal is also displayed on the other terminals. However, in the method, in which terminal the error may occur is not considered.

In the method in Japanese Patent Application Laid-Open No. 2002-49434, in the installation of the application in the terminal, the determination of the installation is delegated to the server. However, how the determination of the installation is to be performed at the server side is not discussed.

In the method in Japanese Patent Application Laid-Open No. 2006-243911, until the market failure countermeasure application becomes available, an information file (failure dictionary) including avoidance methods to known failures is sent to the client environment. Further, the failure dictionary file is provided in a state the file can be always remotely updated from the server apparatus to prevent occurrence of failures. However, in this method, the failure dictionary is not created by determining what condition of the terminal causes a failure.

In Japanese Patent Application Laid-Open No. 2004-5254, all icons of installable applications are displayed on the terminal, and at the time of icon click, if the relevant application has already installed, the application is activated. If the application has not installed yet, a dialog for asking the user whether to install the application is displayed, and the installation is performed. However, a condition for changing the operation at the time of icon click is only the installation state of the application in the terminal.

Now, it is assumed that an environment where many applications have been registered in an application distribution server, and users of various terminals download an application from the application distribution server to use the application is provided. In such an environment, if a failure is found after the release of the application, it is necessary to inhibit the execution of the application. However, conditions causing errors sometimes include a combination of an application and a terminal, and in such a case, it is not necessary to notify all user terminals of the application having caused the failure.

SUMMARY OF THE INVENTION

The present invention is directed to detecting a condition causing an application error in a certain terminal. The present invention provides an application management system for inhibiting execution of an application causing an error by limiting to terminals (users) in which an error may occur, a management apparatus, an application execution terminal, a management method, a method of controlling an application execution terminal, and a storage medium.

According to an aspect of the present invention, an information processing apparatus to which a plurality of information processing terminals are connected via a network is provided. The information processing apparatus includes a storage unit configured to store information about the information processing terminals, and information of an application installed in the information processing terminals, a reception unit configured to receive error information of the application in the information processing terminals, a determination unit configured to, based on the error information, the information about the information processing terminals, and the information of the application, determine a condition that the application causes an error, and a transmission unit configured to transmit, out of the plurality of information processing terminals, to the information processing terminals in which the installed application the error, information indicating that the installed application satisfies the condition for causing the error.

Further features and aspects of the present invention will become apparent from the following description of exemplary embodiments with reference to the attached drawings.

BRIEF DESCRIPTION OF THE DRAWINGS

FIG. 1A illustrates an example of a hardware configuration of a server and a terminal.

FIG. 1B illustrates an example of a system configuration of a server and a terminal.

FIG. 5 is a flowchart illustrating a procedure of error condition determination according to the first exemplary embodiment.

FIG. 6A illustrates an error report management table according to the first exemplary embodiment.

FIG. 6B illustrates an error condition determination table according to the first exemplary embodiment.

FIG. 12A illustrates an error condition determination table according to a third exemplary embodiment.

FIG. 12B illustrates an error condition determination table according to the third exemplary embodiment.

FIG. 13A illustrates an error report management table according to a fourth exemplary embodiment.

FIG. 13B illustrates an error condition determination table according to the fourth exemplary embodiment.

FIG. 14A illustrates an error report management table according to a fifth exemplary embodiment.

FIG. 14B illustrates an error condition determination table according to the fifth exemplary embodiment.

FIG. 20A illustrates examples of changes of an icon according to the first exemplary embodiment.

FIG. 20B illustrates a terminal identification information management table according to the first exemplary embodiment.

FIG. 20C illustrates an application installation state management table according to the first exemplary embodiment.

FIG. 21 illustrates an application execution state management table according to the fifth exemplary embodiment.

FIG. 25 is a flowchart illustrating a procedure of error detection and error report of an application according to a tenth exemplary embodiment.

DESCRIPTION OF THE EMBODIMENTS

Figure 2:
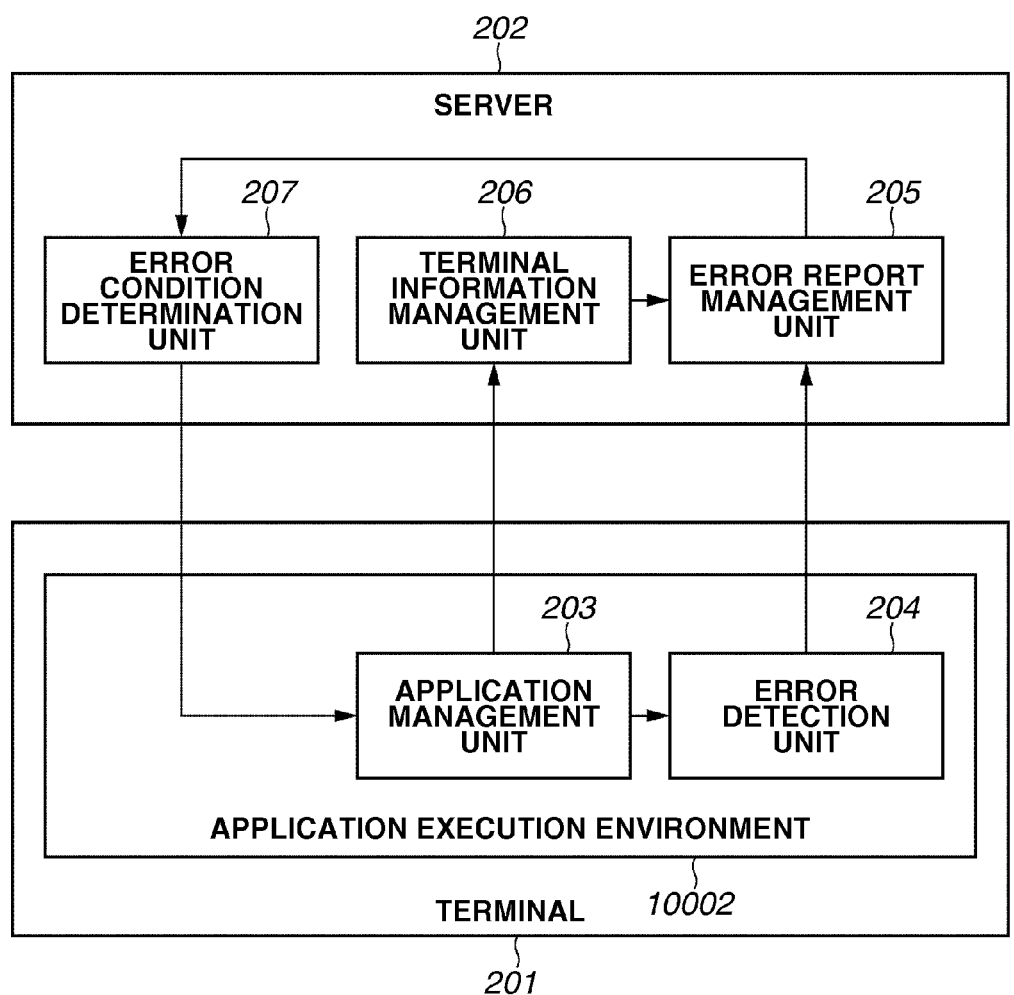
FIG. 2 is a block diagram illustrating functions of a server and a terminal according to a first exemplary embodiment.

Hereinafter, exemplary embodiments of the present invention will be described in detail with reference to the attached drawings. The configurations described in the following exemplary embodiments are only examples, and the present invention is not limited to the illustrated configurations.

A first exemplary embodiment will be described.

FIG. 1A illustrates an example of a hardware configuration of a typical information management apparatus 101 that is assumed to be used as hardware of a server 202 and a terminal 201. As illustrated in FIG. 1A, the information management apparatus 101 includes a central processing unit (CPU) 11 as a hardware configuration.

The CPU 11 performs processing according to a program corresponding to each of the following application and the program execution environment stored in a storage device 13 to implement each function or flowchart described below.

The CPU 11 is, via a bus 10, interconnected with an input device 12, the storage device 13, and a display device 14. The storage device 13 includes, for example, a read-only memory (ROM), a random access memory (RAM), and a hard disk device, and stores, in addition to the above-described each program, data to be used in the processing according to the program. The display device 14 is used to display a screen, or the like. A control program is provided to perform display control of the display device. The input device 12 is a key board and/or a mouse for entering information. An external connection interface (IF) 15 is a network interface, or various kinds of interfaces for connecting with an external device.

The CPU 11 can serve as various kinds of units by executing a program. An application-specific integrated circuit (ASIC) that cooperates with the CPU 11 may function as these units. Alternatively, these units may be implemented by cooperation of the CPU 11 and a control circuit for controlling operations of an image processing apparatus. It is not necessary that a single CPU 11 be used, alternatively, a plurality of CPUs 11 may be used. In such a case, the CPUs 11 can work in a distributed manner to perform processing. The CPUs 11 may be arranged in a single computer or in physically different computers. Alternatively, units realized by the CPU 11 executing a program may be implemented by a dedicated circuit.

A system configuration constructed on the information processing apparatus 101 will be described with reference to FIG. 1B. FIG. 1B illustrates a system configuration of the information management apparatus 101.

An operating system 10001 is software to be a platform for the entire system. An application execution environment 10002 is software, for example, like a virtual machine, for providing an environment in which applications can operate on its own software while functioning as a process on the operating system 10001. The application execution environment 10002 includes a function for managing an operating state of each application 10003.

A hardware configuration and a system configuration of the server 202 and the terminal 201 according to the exemplary embodiment are similar to those of the information management apparatus 101. The server 202 can be interconnected with many connectable terminals 201. Hardware configurations and the operating systems 10001 of the individual terminals 201 may differ depending on models or versions. Further, the terminals 201 individually select applications to be installed, and consequently, the system configurations may vary. Due to the variations, the applications operate on various execution environments, and in an environment satisfying a certain condition, an error may occur.

To solve the problem, a condition causing an error is to be detected based on information of the error occurred in a certain terminal, and a warning is to be issued to user's terminals running the application on execution environments satisfying the condition. Further, a mechanism enabling users to readily stop the execution of the application causing the error is to be provided.

In this exemplary embodiment, to solve the problems, a mechanism enabling users to readily instruct uninstallation or update of an application that may cause an error is implemented by a system having the server 202 and the terminal 201.

Figure 3:
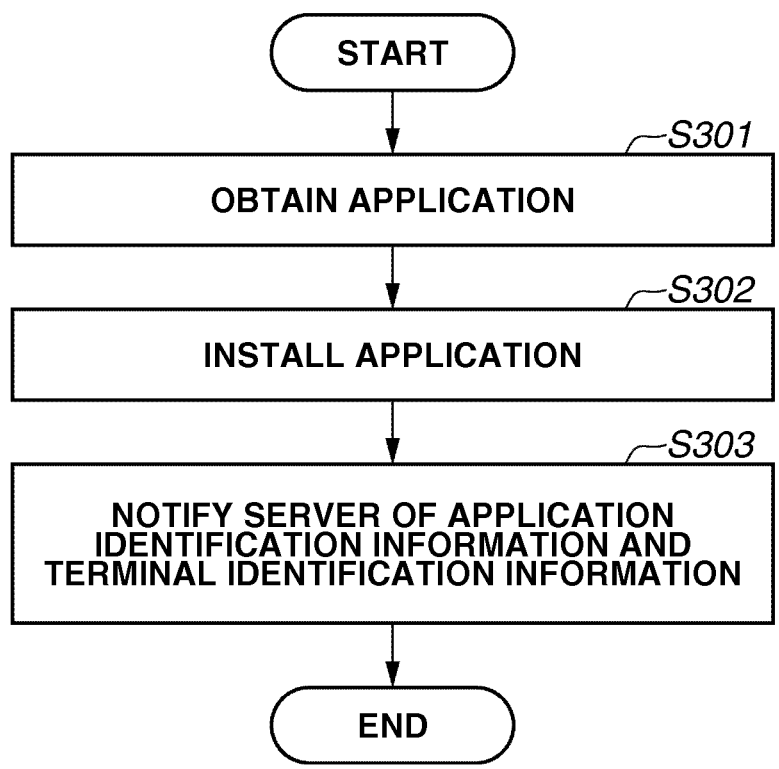
FIG. 3 is a flowchart illustrating a processing procedure of installation of an application according to the first exemplary embodiment.

Hereinafter, a specific operation of the system including the server 202 and the terminal 201 will be described. First, with reference to FIG. 2, FIG. 3, FIG. 20B, and FIG. 20C, an operation of installing an application in the terminal 201 is described. FIG. 2 is a block diagram illustrating functions provided to the server 202 and the terminal 201. FIG. 3 is a flowchart illustrating a processing of installing an application by an application management unit 203. The flowchart is implemented by the CPU executing a control program. FIG. 20B illustrates a terminal identification information management table 2002 for managing terminal identification information by a terminal information management unit 206. FIG. 20C illustrates an application installation state management table 2003 for managing installation states of applications by the terminal information management unit 206.

The terminal 201 includes, in the application execution environment 10002, the application management unit 203 for performing application management (installation, update, uninstallation, and activation). An application has an application ID unique to each application. Further, to manage update by modified versions, the application has a version number. Hereinafter, information including the application ID and the version number is referred to as application identification information. The terminal 201 has a terminal model name that is the name of the model of the terminal, a terminal ID unique to each terminal, and terminal versions varying depending on a firmware or a hardware configuration. Hereinafter, information including the terminal model name, the terminal ID, and the terminal version is referred to as terminal identification information. The terminal identification information may include, for PUSH communication described below, an IP address of the terminal.

In step S301, the terminal 201 obtains a program of an application at the start of installation of the application. The obtainment is performed via a network of the input device 12 or the storage device 13. In response to the obtainment of the application, in step S302, the application management unit 203 starts the installation. In response to the completion of the installation, in step S303, the application management unit 203 sends the application identification information of the installed application and the terminal identification information to the terminal information management unit 206 of the server 202. In response to the transmission completion, the installation ends. The completion of the transmission is not an essential condition for installation completion conditions. For example, when the terminal 201 cannot access the network, the transmission can be executed later.

The server 202 manages the sent application identification information and the terminal identification information in the terminal information management unit 206. The terminal identification information is managed in the terminal identification information management table 2002. Based on the transmitted information, the server can recognize that the terminal 201 has installed the application. Then, the terminal information management unit 206 adds, to the application installation state management table 2003, the transmitted application identification information and the terminal ID in the terminal identification information.

Figure 4:
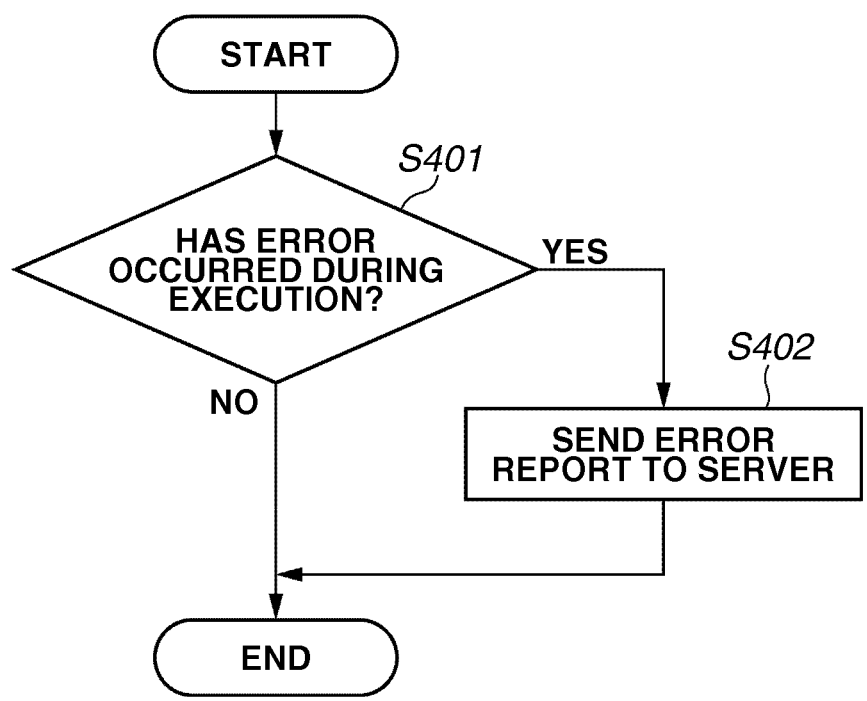
FIG. 4 is a flowchart illustrating a procedure of error detection and error report of an application according to the first exemplary embodiment.

With reference to FIGS. 2 and 4, operations to be performed when an error has occurred on the application running on the terminal 201 will be described. FIG. 4 is a flowchart illustrating processing to be performed by an error detection unit 204 when an error has occurred during the execution of the application. The flowchart is implemented by the CPU executing a control program.

The application management unit 203 activates the application that operates on the terminal 201. In step S401, the application execution environment 10002 detects an exception or an error that has occurred during the execution of the application with the error detection unit 204. In step S402, in response to the occurrence of the error (YES in step S401), the error detection unit 204 analyzes a program stack, and identifies the application that has made the error. Then, the error detection unit 204 sends, to the server, the application identification information of the application that has made the error, the information (error message) of the program stack at the time of the occurrence of the error, and the terminal identification information. Hereinafter, a message including the application identification information of the application that has made the error, the information (error message) of the program stack at the time of the occurrence of the error, and the terminal identification information is referred to as an error report.

Figure 22:
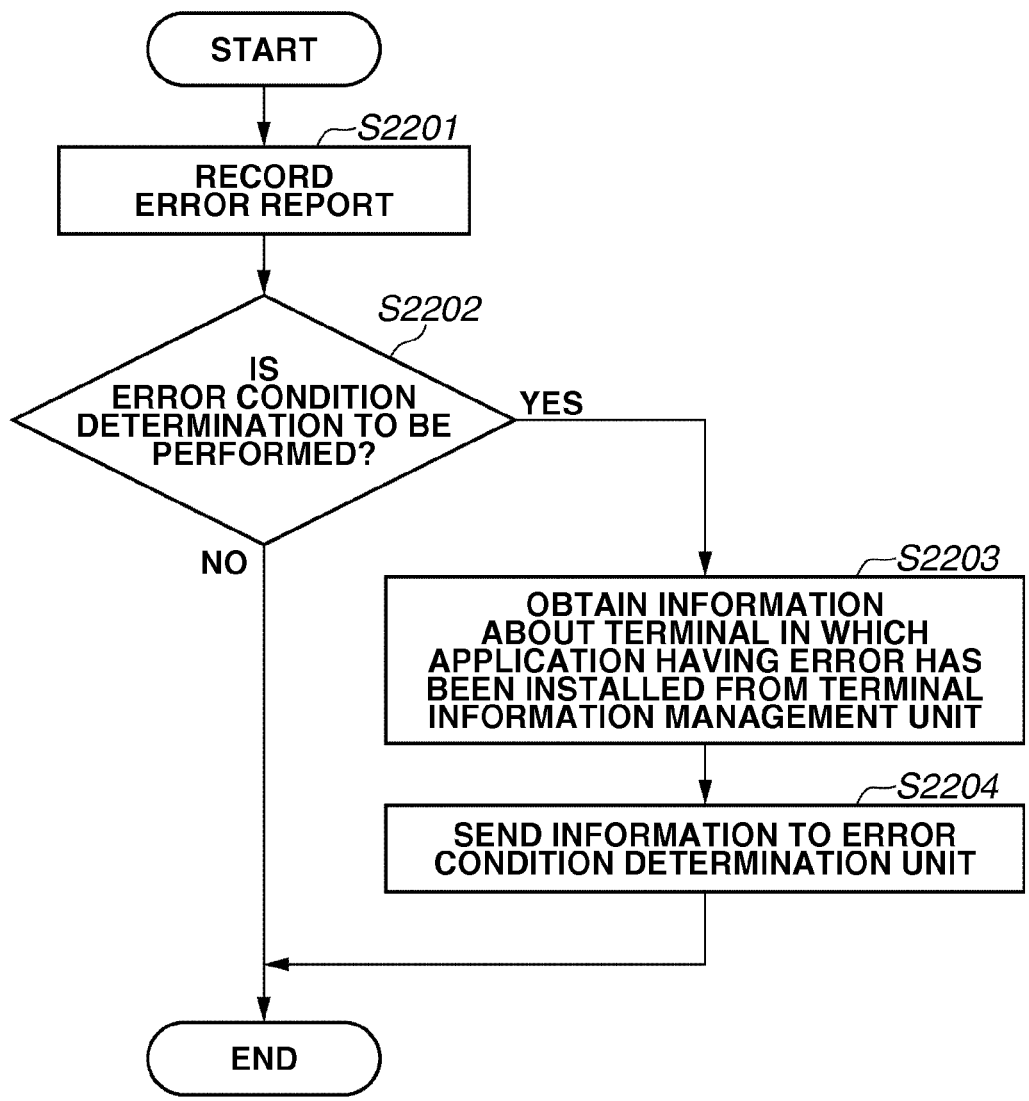
FIG. 22 is a flowchart illustrating a procedure of processing in error report reception according to the first exemplary embodiment.

With reference to FIGS. 2, 22, 6A, and 6B, operations to be performed when the server 202 receives an error report from the terminal 201 will be described. FIG. 22 is a flowchart illustrating an operation of the server 202 at the time of error report reception. The flowchart is implemented by the CPU executing the control program. FIG. 6A illustrates an error report management table 601 to be used by an error report management unit 205 to manage received error reports. FIG. 6B illustrates an error condition determination table 602 to be used by an error condition determination unit 207 to detect a condition causing an error.

The server 202, in response to a reception of an error report, starts the processing in the error report management unit 205. In this exemplary embodiment, the content of the error report newly received this time is the content in the third line in the error report management table 601. Further, a rate of the number of the terminals that have reported the errors in the number of the terminals that have installed the application is defined as a rate of occurrence of errors. If the error occurrence rate is 50% or more, the error condition determination unit 207 determines that an error condition is satisfied.

In step S2201, the error report management unit 205 records a received error report in the error report management table 601. In step S2201, based on the received report, the error report management unit 205 recognizes that the application of the application ID=AppID_1 has made an error. Hereinafter, the application corresponding to the application ID=AppID_1 is referred to as an application A.

After the recording of the error report, in step S2202, the error report management unit 205 determines whether to perform an error condition determination. The determination is performed because the error condition determination for each error report reception increases the load. The determination methods include a method of performing the error condition determination when the number of received error reports reaches a predetermined number since the last determination. Alternatively, the error condition determination may be performed at predetermined time once a day. In this exemplary embodiment, as an example, an error report of the application A is received.

In step S2202, if the error report management unit 205 determines to perform the error condition determination (YES in step S2202), in step S2203, the error report management unit 205 obtains, from the terminal information management unit 206, the terminal identification information of the terminals in which the application A have been installed. After the obtainment, in step S2204, the error report management unit 205 sends, to the error condition determination unit 207, the terminal identification information of the terminals in which the application A have been installed and the information of the error report management table 601 to instruct to perform the error condition determination.

The information to be sent to the error condition determination unit 207 may be a part of the information in the error report management table 601. For example, with respect to an application having error reports of 100 or more, the error condition determination unit 207 determines an error condition. In the determination, the error report management unit 205 counts the number of errors for each application, and sends the information about the application having the error reports of 100 or more to the error condition determination unit 207 to reduce the size of the data to be transmitted.

Hereinafter, with reference to FIG. 5, the error condition determination processing will be described. FIG. 5 is a flowchart illustrating an operation of the error condition determination to be performed by the error condition determination unit 207. The flowchart is implemented by the CPU executing the control program.

The error condition determination unit 207 determines a condition causing the errors from the transmitted information. In step S501, in the determination, the error condition determination unit 207 counts the number of terminals that have installed the application A for each terminal model name, and creates the error condition determination table 602. Alternatively, the error condition determination unit 207 stores the error condition determination table 602 created in the previous determination, and updates the table. In step S502, the error condition determination unit 207 checks the error condition determination table 602 and finds that in a case where the terminal model name is Device_X, the error occurrence rate of the application A is 50%, and the rate exceeds a predetermined error occurrence rate. Therefore, the error condition determination unit 207 determines that an error condition of the application A is a case where the application A is installed in the terminal Device_X. In step S503, the error condition determination unit 207 refers to tables 2002 and 2003, based on the information of the terminal model that has installed the application A, notifies the terminals having the terminal model name of Device_X of that the application A satisfies condition to cause errors. Hereinafter, the notification is referred to as an error application notification. Methods for the error application notification include a PUSH transmission from the server 202 to the terminals 201, and a method of performing polling by the terminals 201 on the server 202.

Figure 7:
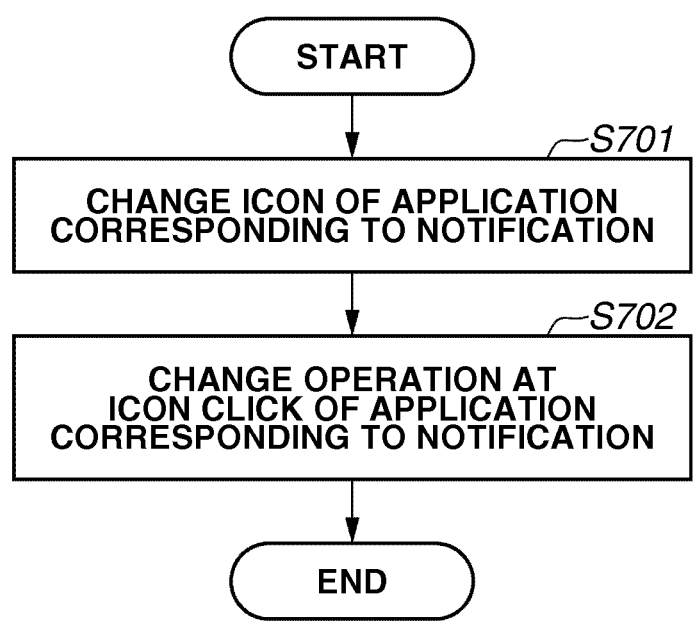
FIG. 7 is a flowchart illustrating a procedure of processing in error notification reception according to the first exemplary embodiment.

With reference to FIGS. 2, 7, and 20A, a processing to be performed when the terminal 201 receives an error application notification will be described. FIG. 7 is a flowchart illustrating processing to be performed when the terminal 201 receives an error application notification. The flowchart is implemented by the CPU executing the control program. FIG. 20A illustrates examples of effects to be given to an icon by the application management unit 203 in step S701.

The terminal 201 receives an error application notification and transfers it to the application management unit 203. The application management unit 203 receives the error application notification, and starts reception processing of the error application notification. In step S701, the application management unit 203 makes a change in which the application management unit 203 adds an effect attracting a user's attention to the icon of the application A satisfying the condition for causing errors, changes the display form, and displays the icon. As the effect, for example, as illustrated in a table 2001 in FIG. 20A, a smoke effect, a flame effect, a brightness reduction effect, and a tip giving effect can be provided. In step S702, the application management unit 203 changes the operation at icon click of the application A. In response to the completion of the changing processing, the reception processing of the error application notification ends. However, to avoid image decrease of the application, the processing in step S701 may be omitted. Alternatively, in step S701, to reduce the user's opportunity of starting the error-causing application, the icon may be moved to another screen or another folder.

Figure 8:
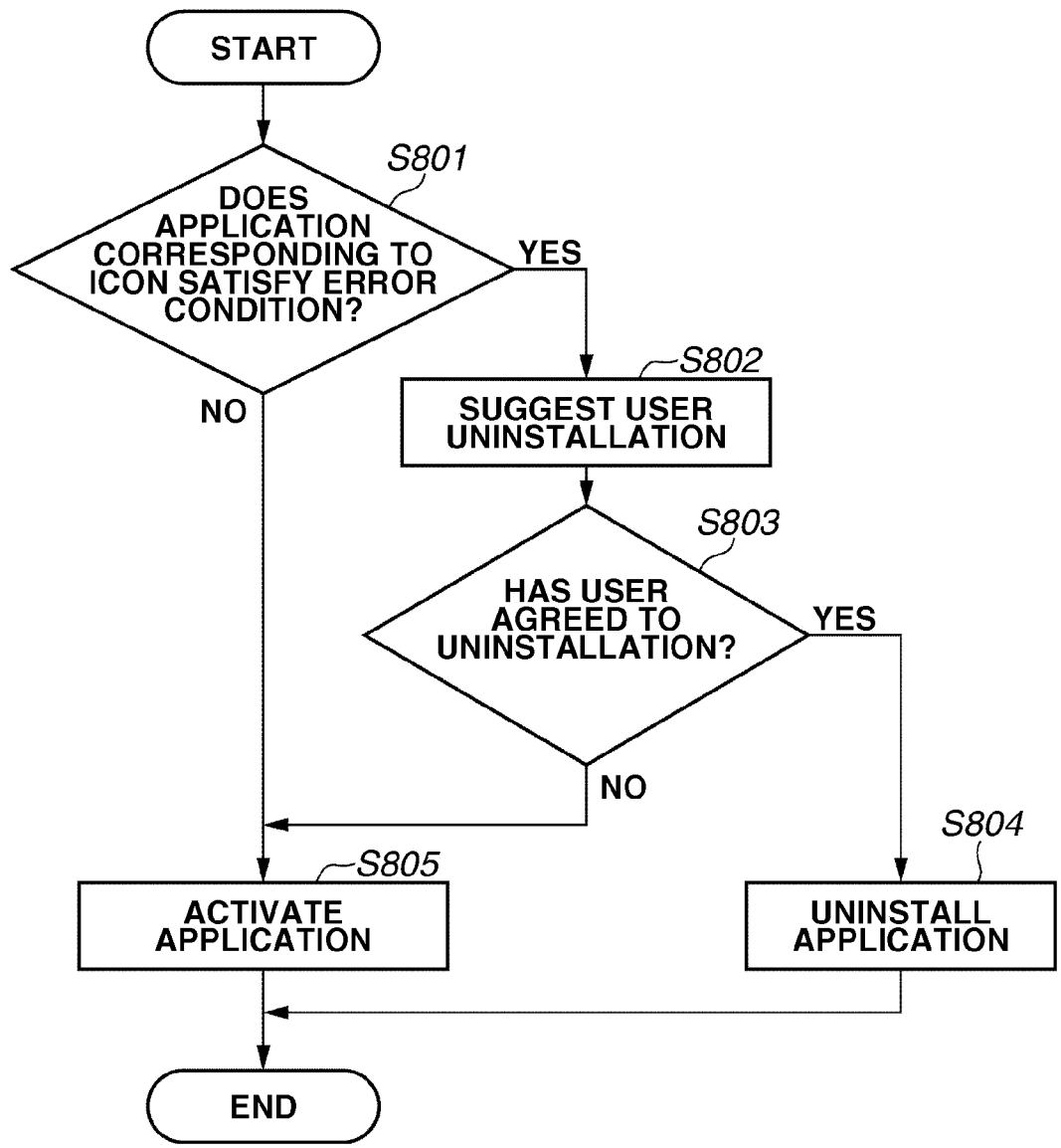
FIG. 8 is a flowchart illustrating a procedure of processing to be performed at icon click of an application according to the first exemplary embodiment.

With reference to the flowchart in FIG. 8, an operation to be performed by the application management unit 203 when an icon of an application displayed on the terminal 201 is clicked will be described. The flowchart is implemented by the CPU executing the control program.

In response to a clicking operation of an icon of an application, the application management unit 203 starts activation processing of the application corresponding to the icon. In step S801, based on a received error application notification, the application management unit 203 checks whether the application to be activation target satisfies an error condition.

If the application to be activation target satisfies the error condition (YES in step S801), in step S802, the application management unit 203 displays a dialog suggesting the user uninstallation of the application. Instead of the suggestion of uninstallation, the application management unit 203 may provide a message indicating that it has been reported that the application to be activation target has a high error rate. Alternatively, a message urging update may be provided.

In step S803, if the user selects the option of the suggested dialog, the application management unit 203 checks whether the user has agreed to uninstallation.

If the user has agreed to uninstallation (YES in step S803), in step S804, the application management unit 203 performs uninstallation processing.

If the user has not agreed to uninstallation (NO in step S803), or in step S801, the application to be activation target does not satisfy the error condition (NO in step S801), in step S805, the application management unit 203 executes the start processing of the application.

In response to the completion of the above processing, the processing performed when the icon of the application is clicked ends.

As described above, the exemplary embodiment in which the error condition determination unit 207 is provided in the server 202 has been described. In this exemplary embodiment, a condition of a terminal that causes an application execution error is determined, and a notification is sent only to user's terminals satisfying the error condition to accurately send the error application notification. Further, an icon of an application having a high error rate is changed or an operation of the application at an icon click operation is changed to inhibit the execution of the application that tends to make errors.

In a case where a combination of an application 1 and a model A, and a combination of the application 1 and a model B have many errors, and a combination of the application 1 and a model C has a few errors, a commonality (for example, small memory capacity) between the model A and the model B is determined. As a result of the determination, if the memory capacity of the model C is also small, a notification indicating that the model C tends to cause errors can be provided.

A second exemplary embodiment will be described.

Hereinafter, operations of the terminal 201 and the server 202 according to the second exemplary embodiment will be described. The hardware configurations of the terminal 201 and the server 202 are similar to those illustrated in FIGS. 1A and 1B.

The error condition determination unit 207 can determine an error condition if information of a terminal that has installed an application in which an error has occurred, and the content of the error report management table 601 are provided. Consequently, the error condition determination unit 207 can be provided in the terminal 201 if, in response to transmission of an error report from the error detection unit 204 to the server 202, the error report management unit 205 sends to the terminal 201 a response of the information given to the error condition determination unit 207 in step S2204.

In the second exemplary embodiment, the server 202 includes the terminal information management unit 206 and the error report management unit 205, and the terminal 201 includes the error condition determination unit 207.

An operation of the terminal 201 for installing an application is similar to that in the first exemplary embodiment. An operation to be performed when an error occurs in an application running on the terminal 201 is similar to that in the first exemplary embodiment. The terminal 201, even if an application execution error has not occurred, checks whether there is a possibility of occurrence of an error in the applications that have been installed in its own terminal. For the purpose, the terminal 201 sends a list of installed applications to the server 202 every predetermined period, and obtains the information of the error report management table 601 corresponding to the applications in the list.

Figure 9:
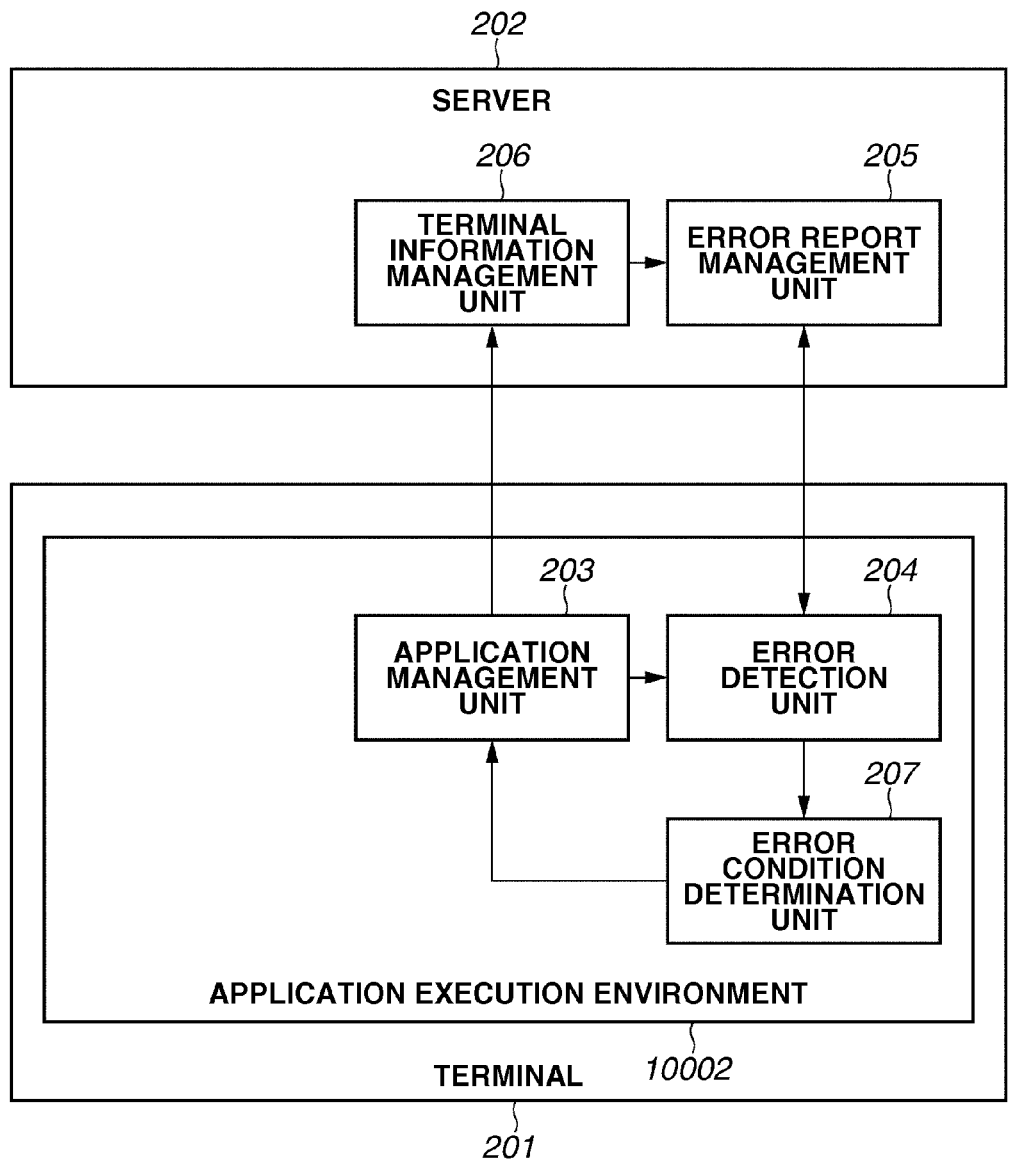
FIG. 9 is a block diagram illustrating functions of a server and a terminal according to a second exemplary embodiment.
Figure 10:
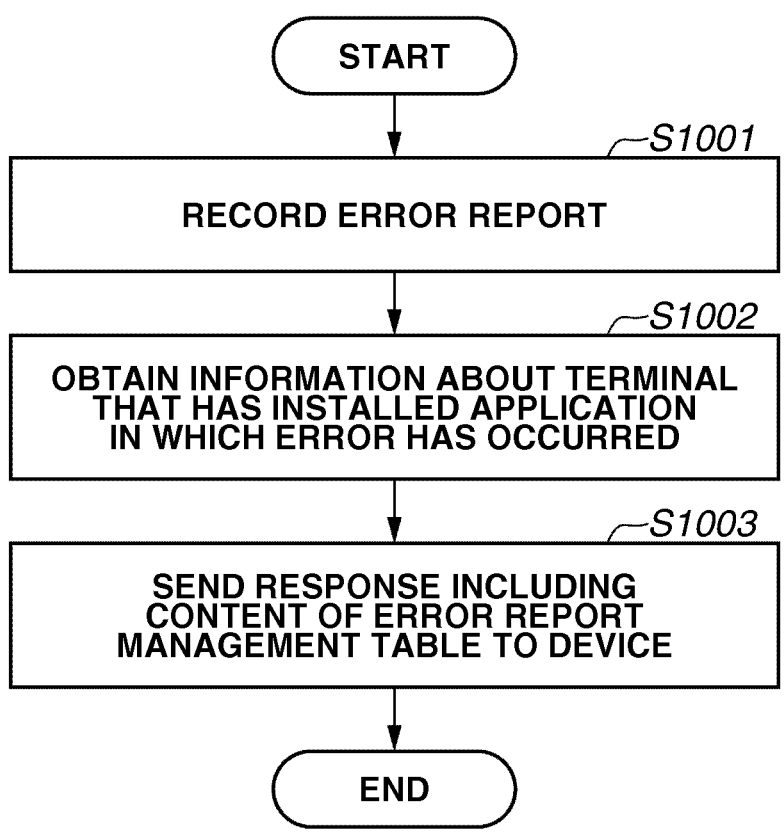
FIG. 10 is a flowchart illustrating a procedure of processing in a server in error report reception according to the second exemplary embodiment.

With reference to FIGS. 6A, 9, and 10, operations to be performed when the server 202 receives an error report will be described. FIG. 9 is a block diagram illustrating functions provided to the server 202 and the terminal 201. FIG. 10 is a flowchart illustrating an operation of the server 202 at the time of error report reception. The flowchart is implemented by the CPU executing the control program.

The server 202, in response to a reception of an error report, starts the processing in the error report management unit 205. In this exemplary embodiment, the content of the received error report is the content in the third line in the error report management table 601.

In step S1001, the error report management unit 205 records the received error report in the error report management table 601. In step S1001, based on the received report, the error report management unit 205 recognizes that errors have occurred in the application A (see the definition in the first exemplary embodiment).

In step S1002, similarly to the processing in step S2203, from the terminal information management unit 206, the error report management unit 205 obtains the terminal identification information of the terminals that have installed the application A. After the obtainment, in step S1003, the error report management unit 205 sends, to the terminal 201, a response including the terminal information of the terminals in which the application A has been installed and the information of the error report management table 601. In this processing, it is not necessary to include all of the information in the error report management table 601 in the response. To reduce the size of the response message, a table including only the error report relating to the application A may be sent. Alternatively, from the content of the error report management table 601, the information of the error message and the terminal ID may be deleted and sent. Alternatively, the terminal identification information obtained from the terminal information management unit 206 may be summarized as the number of terminals of each model, and sent. Alternatively, if an environment capable of performing push communication from the server 202 to the terminal 201 is provided, a response message may be sent to all terminals that have installed the application A. In response to the transmission of the response to the terminal 201, the error report reception processing ends.

Figure 11:
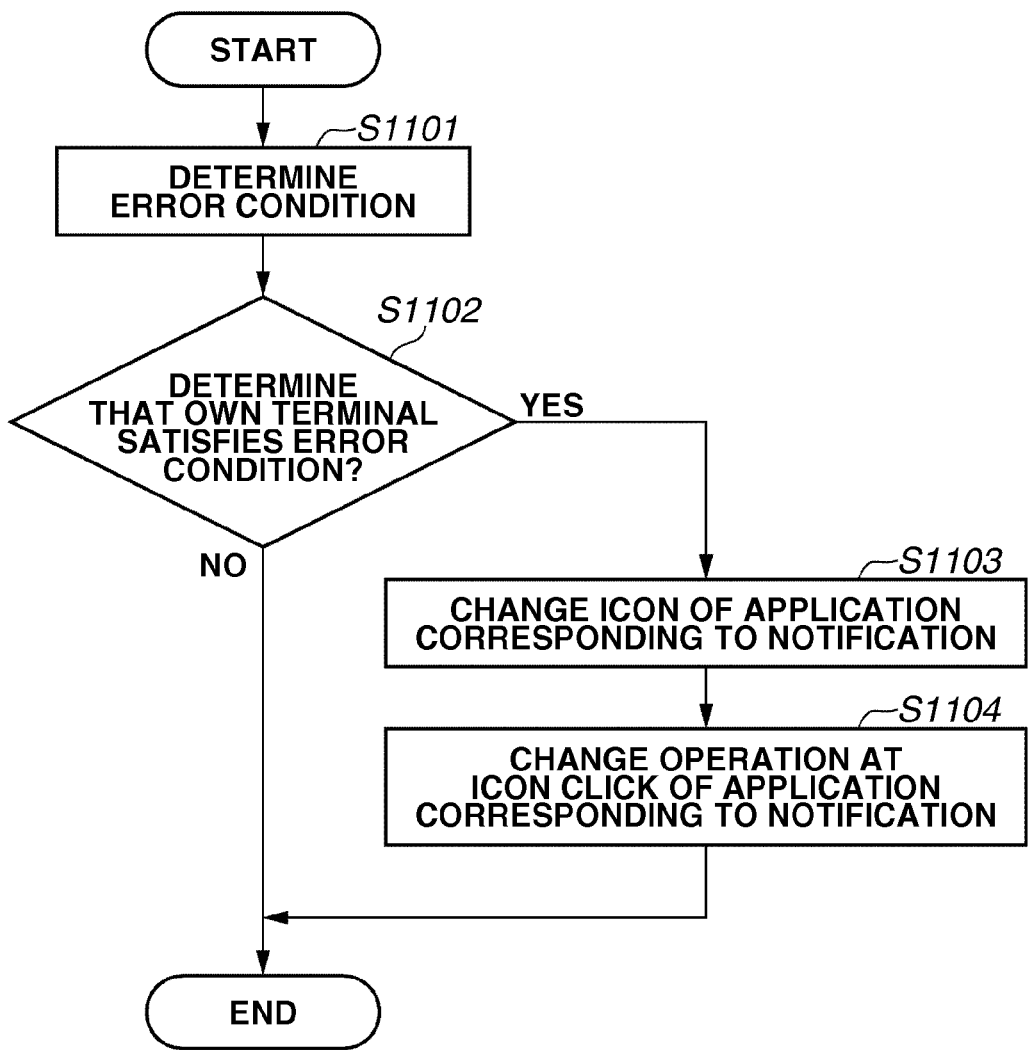
FIG. 11 is a flowchart illustrating a procedure of error condition determination according to the second exemplary embodiment.

With reference to FIGS. 9 and 11, operations to be performed when the error detection unit 204 receives an error report response from the server 202 will be described. FIG. 11 is a flowchart illustrating an operation of the error condition determination to be performed by the error condition determination unit 207 in the terminal 201. The flowchart is implemented by the CPU executing the control program. In the second exemplary embodiment, the error condition determination unit 207 is provided at the side of the terminal 201.

The error report response received by the error detection unit 204 includes the information of the terminals that have installed the application A and the information of the error report management table 601. The error detection unit 204 provides the information to the error condition determination unit 207.

In step S1101, the error condition determination unit 207 determines a condition causing the errors from the provided information. The determination processing is similar to that in steps S501 and S502. In step S1102, the error condition determination unit 207 determines whether the own terminal satisfies the error condition. If the own terminal satisfies the error condition (YES in step S1102), in steps S1103 and S1104, the error condition determination unit 207 performs processing similar to that in steps S701 and S702.

Figure 23:
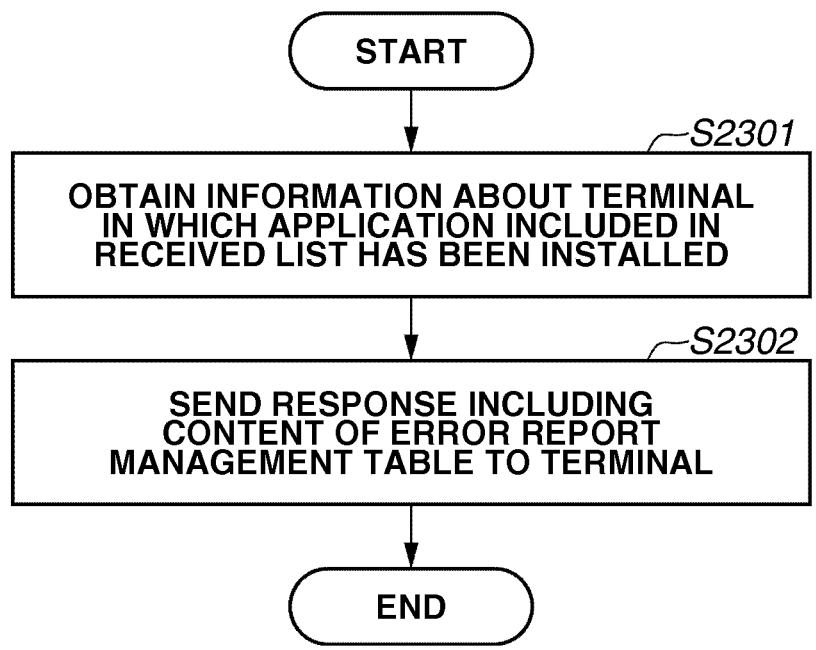
FIG. 23 is a flowchart illustrating a procedure of processing in a server in application list reception according to the second exemplary embodiment.

With reference to the flowchart in FIG. 23, an operation to be performed when the server 202 receives a list of installed applications from the terminal 201 will be described. The flowchart is implemented by the CPU executing the control program.

The server 202, in response to a reception of a list of applications, starts the processing in the error report management unit 205. In step S 2301, similarly to the processing in step S2203, from the terminal information management unit 206, the error report management unit 205 obtains the terminal identification information of the terminals that have installed the applications included in the list. After the obtainment, in step S2302, the error report management unit 205 sends, to the terminal 201, a response including the information of the terminals that have installed the applications and the information of the error report management table 601. To reduce the size of the message to send, for the response content, processing similar to that in step S1003 can be performed.

The terminal 201 receives the response and performs processing similar to that in steps S1101, S1102, S1103, and S1104.

As described above, the exemplary embodiment in which the error condition determination unit 207 is provided in the terminal 201 has been described.

A third exemplary embodiment will be described.

An application can be changed by update. The terminal 201 can also be changed by update. In the error condition determination table 602, an error condition is determined using an application ID and a terminal model name, however, further accurate determination can be performed by considering an application version and a terminal version. In the third exemplary embodiment, the error condition determination unit 207 refers to an application version and a terminal version. The error condition determination unit 207 may be provided at the terminal 201 side or the server 202 side.

With reference to FIGS. 12A and 12B, an operation of the error condition determination unit 207 according to the third exemplary embodiment is described. The table in FIG. 12A is an error condition determination table 1201 for calculating an error occurrence rate of the version 1.0 of the application A, generated by the error condition determination unit 207. FIG. 12B illustrates an error condition determination table 1202 for calculating an error occurrence rate of the version 2.0 of the application A. The hardware configuration of the terminal 201 and the server 202 is similar to that illustrated in FIG. 1A.

As an example, a case where the terminal 201 sends an error report relating to the application A will be described. It is assumed that the application A has the versions 1.0 and 2.0. Further, it is assumed that the terminal 201 of a model name Device_X has a terminal version 1 and a terminal version 2. Further, it is assumed that the terminal 201 of a model name Device_Y has only a terminal version 1.

After reception of an error report, similarly to the processing in step S2204, the error report management unit 205 sends the information to the error condition determination unit 207.

The error condition determination unit 207 creates the error condition determination table 1201 relating to the version 1.0 of the application A and the error condition determination table 1202 relating to the version 2.0 of the application A. Alternatively, the error condition determination unit 207 stores the error condition determination table 1201 and the error condition determination table 1202 created in the previous determination, and updates the tables.

In each table, the terminals 201 are classified by terminal model names and terminal versions. The error condition determination unit 207, with respect to each classified column, calculates an error occurrence rate based on the number of installed terminals and the number of terminals in which errors have occurred. The error condition determination unit 207 determines a combination of an application, an application version, a terminal model name, and a terminal version in which an error occurrence rate is equal to or more than 50% to be an error condition. In the case of the table 1201, the error condition determination unit 207 determines a combination of the application A, the application version 1.0, the terminal model name Device_Y, and the terminal version 1 to be an error condition. In the case of the table 1202, the error condition determination unit 207 determines a combination of the application A, the application version 2, the terminal model name Device_X, and the terminal version 2 in which an error occurrence rate of is 100% to be an error condition. The considerations of the versions of the application and the terminal 201 allows the accuracy of the error condition determination to be increased.

It is to be noted that depending on the setting method of the application ID, without using the application version information, the determination can be performed at a similar accuracy. In a case where the versions of the application differ, the application ID is to be set to have different application IDs to eliminate the need for the application version information. Similarly, in a case where the terminal versions differ, the terminal model name is to be set to have different terminal model names to eliminate the need for the terminal version information.

As described above, the exemplary embodiment in which the error condition determination unit 207 considers application versions and terminal versions has been described.

A fourth exemplary embodiment will be described.

A plurality of applications can be operated on the terminal 201, and combinations of the installed applications can cause errors. In the fourth exemplary embodiment, the error condition determination unit 207 refers to combinations of applications.

With reference to FIGS. 13A and 13B, operations of the error condition determination unit 207 and the error report management unit 205 according to the fourth exemplary embodiment will be described. FIG. 13A illustrates an error report management table 1301 managed by the error report management unit 205. FIG. 13B illustrates an error condition determination table 1302 to be created by the error condition determination unit 207 for an error condition determination. The hardware configuration of the terminal 201 and the server 202 is similar to that illustrated in FIG. 1A.

As an example, a case where the error report management unit 205 receives an error report relating to the application A will be described. In response to reception of an error report, the error report management unit 205 performs processing similar to that in step S2201. In addition, the error report management unit 205 stores, in the error report management table 1301, a list of installed applications of the terminal 201 that has sent the error report as information at the error occurrence. The list of the installed applications may be obtained from the terminal information management unit 206 or the terminal 201 may include the list in the error report.

For example, it is assumed that the error report received by the error report management unit 205 includes the content of the third line in the error report management table 1301, however, the error report management table has stored only the content of the first and second lines. The received report is sent from the terminal 201 of the terminal ID of ID_3. The list of the installed application of the terminal 201 of ID_3 includes the application having the application ID of AppID_30 and the version of the application is v1, and the application having the application ID of AppID_10 and the version of the application is v1. In this case, the error report management unit 205 adds the content of the third line in the error report management table 1301 to the error report management table 1301. Then, similarly to the processing in step S2204, the error report management unit 205 sends the information to the error condition determination unit 207.

The error condition determination unit 207, similarly to the processing in step S501, creates the error condition determination table 1302. Alternatively, the error condition determination unit 207 stores the error condition determination table 1302 created in the previous determination, and updates the table. In the error condition determination table 1302, the terminals 201 that have installed the application A are classified and counted by combinations with other installed applications. As described above, the error condition determination unit 207 determines a condition of the error occurrence rate of 50% or more to be an error condition. The error occurrence condition may be a fixed value or a variable. From the error condition determination table 1302, the error condition determination unit 207 determines that the case the application C has been installed is an error condition of the application A. As described above, the error condition determination unit 207 considers the combinations of the applications to increase the accuracy of the error condition determination.

In the error condition determination, a large amount of reported error logs are analyzed in data mining techniques. In this exemplary embodiment, the analysis target elements are not limited to the types of applications and versions, but extended to the application list of the installed applications to extract combinations of applications of high error occurrence rates.

In the determination, errors due to combinations of the applications are always to be determined, however, the increase in the analysis target elements increases the load in the data mining. To solve the problem, using the load of the server that processes the error condition determination unit 207 as a trigger, when the load is low, the error determination can be performed using the combinations of the applications. If the error condition determination unit 207 depends on another application, the application depending on the setting file of the application may be described. In such a case, the description of the application depending on the setting file may be used as a trigger to determine errors due to combinations of applications.

In executing an application that is the target of an error application notification, the application management unit 203 of a terminal that has received the error application notification may indicate another application that may cause an error when simultaneously executed, and suggest stopping the application. Alternatively, the application management unit 203 may suggest uninstallation of the application that is the target of the error application notification.

As described above, the exemplary embodiment in which the error condition determination unit considers combinations of applications has been described. The error condition determination unit can determine an error condition due to a combination in execution of applications using a list of applications being used at the time of error as the information at the error occurrence managed by the error report management table 1301.

A fifth exemplary embodiment will be described.

No error will occur as long as an application is not executed. Consequently, if there is a terminal that has installed an application but the application has not been executed, conditions causing errors are not correctly determined by the error occurrence rate defined in the first exemplary embodiment. The use of a run-time error occurrence rate calculated from the number of times of application execution and the number of errors enables further accurate error condition determination. In the fifth exemplary embodiment, the error condition determination unit determines an error condition using a run-time error occurrence rate calculated from the number of times of application execution and the number of errors.

With reference to FIGS. 14A, 14B, and 21, operations of the error condition determination unit 207 and the error report management unit 205 according to the fifth exemplary embodiment will be described. FIG. 14A illustrates an error report management table 1401 managed by the error report management unit 205. FIG. 14B illustrates an error condition determination table 1402 to be created by the error condition determination unit 207 for an error condition determination. FIG. 21 illustrates an execution state management table 2101 for applications managed by the terminal information management unit 206. In a case where a run-time error occurrence rate calculated from the number of times of application execution and the number of errors is 50% or more, the error condition determination unit 207 determines the condition to be an error condition. The hardware configuration of the terminal 201 and the server 202 is similar to that illustrated in FIG. 1A. In the first exemplary embodiment, the denominator in the calculation of an error occurrence rate is the number of installed terminals. In the fifth exemplary embodiment, the denominator in the calculation of an error occurrence rate is the number of times of execution.

The application management unit 203 records the number of times an application has been executed. Immediately before transmission of an error report, after a predetermined times of execution of an application, or after a predetermined time period has passed since the last report of the number of times of execution, to the server 202, the application management unit 203 reports the number of times of execution of each application that has been recorded. The server 202 receives the report and increments the number of times of execution in the application execution state management table 2101 being managed by the terminal information management unit 206. In response to the completion of the report, the application management unit 203 initializes the number of times of execution that has been recorded to zero.

Hereinafter, processing of receiving an error report relating to the application A by the error report management unit 205 will be described. In response to reception of an error report, the error report management unit 205 performs processing similar to that in step S2201. Then, similarly to the processing in step S2204, the error report management unit 205 sends the information to the error condition determination unit 207. The information to be sent to the error condition determination unit 207 includes the information of the terminals 201 that have executed the application A and the content of the error report management table 1401.

The error condition determination unit 207 creates the error condition determination table 1402 from the transmitted information. Alternatively, the error condition determination unit 207 stores the error condition determination table 1402 created in the previous determination, and updates the table. In the error condition determination table 1402, the terminals 201 that have executed the application A are classified by model names, and the number of times of execution and the number of errors of the terminals are counted. From the error condition determination table 1402, a run-time error occurrence rate is calculated and then, the run-time error occurrence rate of the Device_X exceeds 50%. As a result, it is determined that an error condition of the application A includes the case the application A is executed in the terminals of Device_X. As described above, the error condition determination unit 207 considers the number of times of execution of an application to determine an error condition, and thereby the error condition determination unit 207 can correctly determine an error condition even if there is a terminal that has installed the application but has not executed the application.

As described above, the exemplary embodiment in which the error condition determination unit 207 considers the number of times of execution of an application to determine an error condition has been described.

A sixth exemplary embodiment will be described.

Generally, if an error condition of an application is determined and reported, the developer provides a modified version that enables the application to operate under the error condition, and urges users to update the application to the modified version. The developer can supply the service at a high user satisfaction level by urging the users to update the application after the release of the modified version instead of urging the users to uninstall the application immediately after the determination of the error condition. In the sixth exemplary embodiment, after an error condition determination, until the determination is reported to the developer and a modified version is provided, no notification is sent to the users. The hardware configuration of the terminal 201 and the server 202 is similar to that illustrated in FIG. 1A.

Hereinafter, operations of the error condition determination unit 207 and the application management unit 203 according to the sixth exemplary embodiment will be described. The error condition determination unit 207 is provided at the server 202 side.

Figure 15:
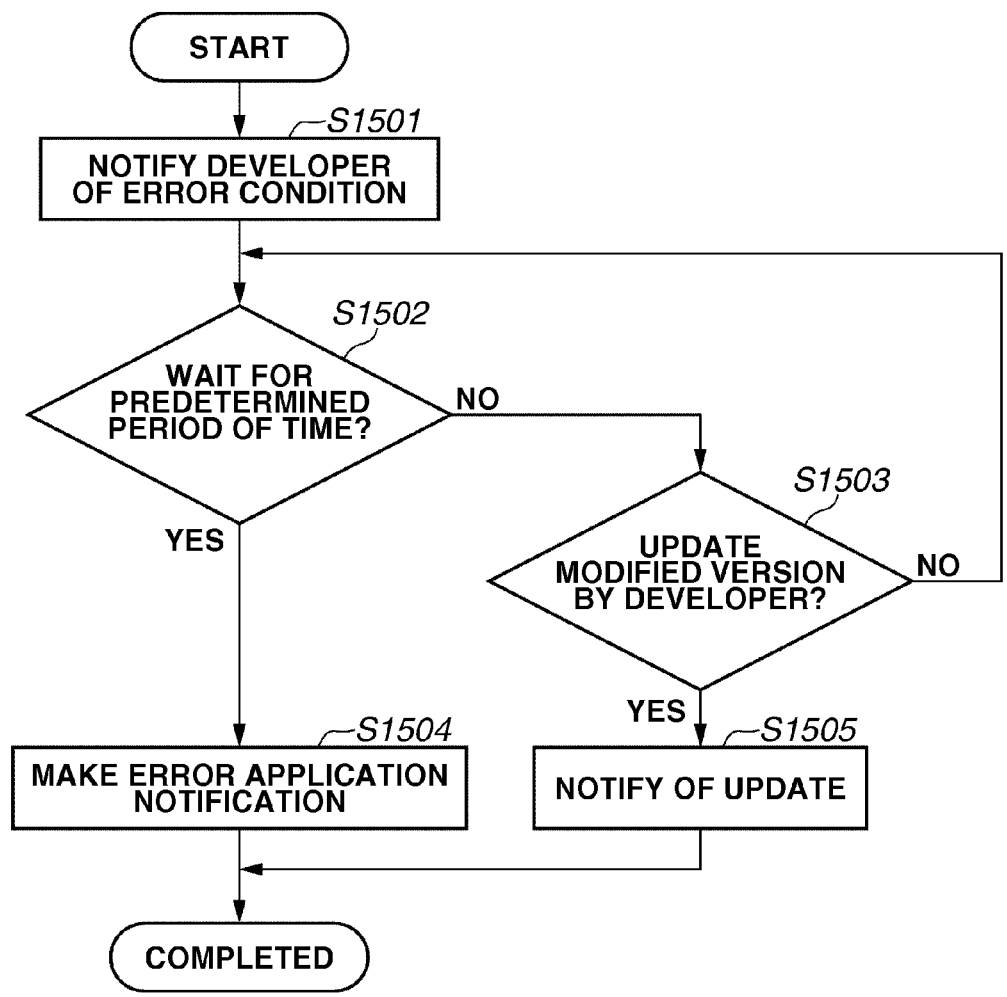
FIG. 15 is a flowchart illustrating a procedure of notification processing of an error condition determination result according to a sixth exemplary embodiment.

With reference to FIG. 15, an operation of notifying the application management unit 203 of a result determined by the error condition determination unit 207 will be described. FIG. 15 is a flowchart illustrating the flow of processing for reporting the developer and notifying the users when the error condition determination unit 207 determines an error condition. The flowchart is implemented by the CPU executing the control program.

An example of determining an error condition of the application A developed by a developer D by the error condition determination unit 207 is described. It is assumed that, although not illustrated in FIG. 2 because the technique is common, the application A is registered in an application distribution server S, and the server 202 can communicate with the server S. The error condition determination unit 207 determines an error condition, and starts notification to the developer D. In step S1501, the error condition determination unit 207 notifies the developer D of an error condition of the application A. The method of notifying the developer D may include a method of notifying the developer D via the server S distributing applications, but not limited to the method. The server 202 may be provided with an application distribution function.

When the error condition determination unit 207 completes the notification to the developer D, in step S1502, the error condition determination unit 207 waits for an error application notification until a predetermined time period has passed. In step S1503, during the standby state, the error condition determination unit 207 checks whether the developer has updated the version of the application A to a modified version.

If the version has updated to a modified version (YES in step S1503), in step S1505, the error condition determination unit 207 notifies the application management unit 203 of the terminal 201 that has installed the application A satisfying the error condition of that a modified version of the application A has provided. Hereinafter, the notification is referred to as a modified version application notification. In step S1502, if a modified version of the application A has not released after a lapse of the predetermined time period (NO in step S1502), in step S1504, the error condition determination unit 207 issues an error application notification. In response to completion of the processing in step S1504 or step S1505, the notification of the error determination result is completed.

Figure 16:
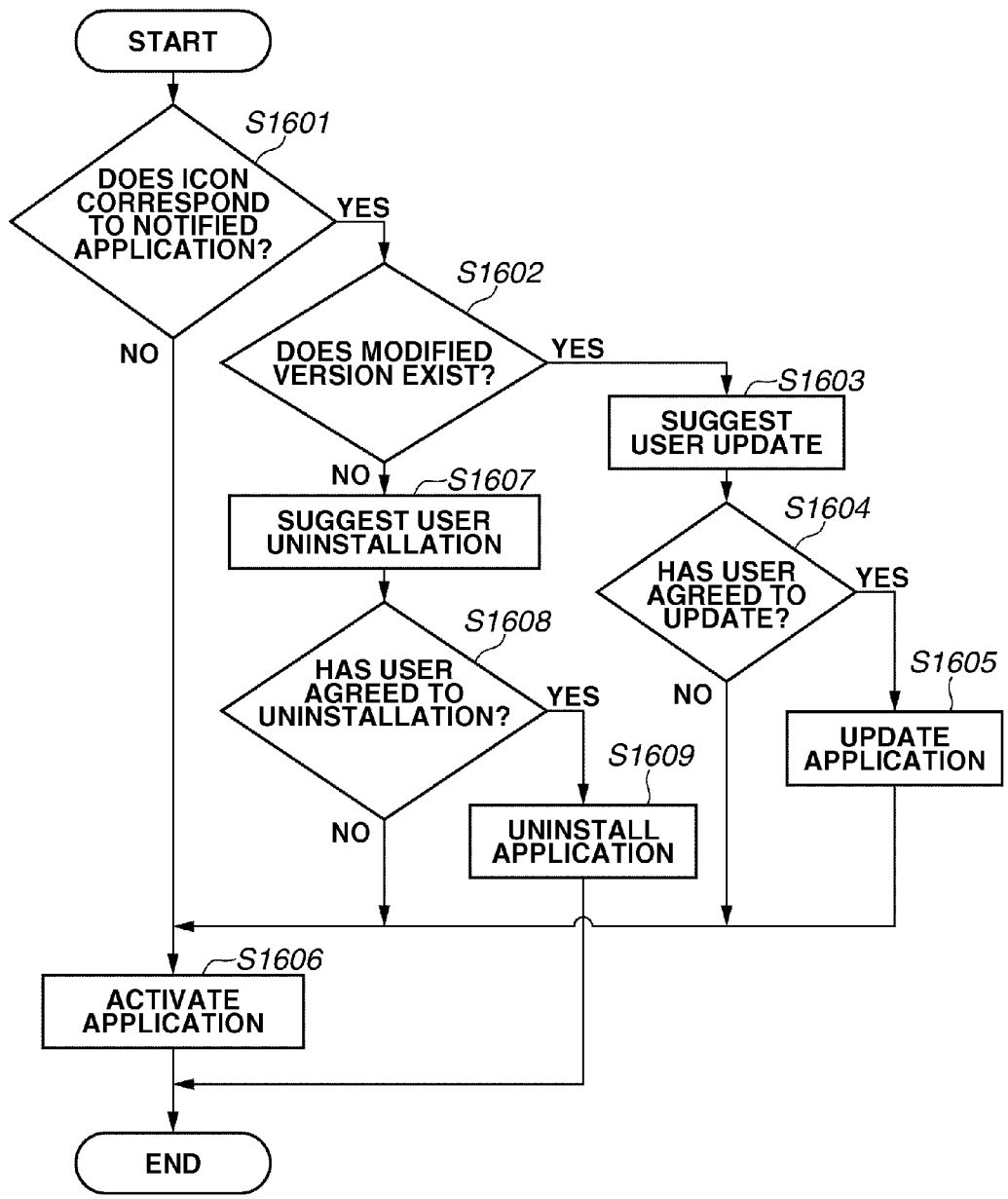
FIG. 16 is a flowchart illustrating a procedure of processing to be performed at icon click of an application according to the sixth exemplary embodiment.

With reference to FIG. 16, an operation to be performed by the application management unit 203 in response to reception of the modified version application notification or the error application notification will be described. FIG. 16 is a flowchart illustrating processing to be performed, in the application management unit 203 that has received an error application notification or a modified version application notification from the error condition determination unit 207, when an icon of an application is clicked. The flowchart is implemented by the CPU executing the control program. The processing for changing graphics of the icon in response to reception of a notification by the application management unit is similar to that in steps S701 and S702.

In response to a clicking operation of an icon of an application by a user, the application management unit 203 starts activation processing of the application corresponding to the icon. Hereinafter, an application to be activation target is referred to as an activation target application. In step S1601, the application management unit 203 checks whether the activation target application corresponds to the error application notification or the modified version application notification that has been received so far. If the activation target application does not correspond to the error application notification or the modified version application notification (NO in step S1601), in step S1606, the application management unit 203 normally starts the application.

If the activation target application corresponds to the error application notification or the modified version application notification (YES in step S1601), in step S1602, based on the modified version application notification, the application management unit 203 checks whether a modified version of the activation target application exists. If a modified version exists (YES in step S1602), in step S1603, the application management unit 203 suggests the user update. The methods of suggestion include, for example, a method of displaying a dialog.

If the user has responded to the suggestion, in step S1604, the application management unit 203 causes the processing to branch to different steps depending on the response content. If the user has agreed to update (YES in step S1604), in step S1605, the application management unit 203 updates the activation target application, and then the process proceeds to step S1606. If the user has not agreed to update (NO in step S1604), the process directly proceeds to step S1606.

If a modified version does not exist (NO in step S1602), in step S1607, the application management unit 203 suggests the user uninstallation. Alternatively, the application management unit 203 suggests the user not to activate the application. In step S1608, the application management unit 203 checks the content of the user's response. If the user has agreed to uninstallation (YES in step S1608), in step S1609, the application management unit 203 uninstalls the activation target application. If the user has not agreed to uninstallation (NO in step S1608), the process proceeds to step S1606.

In response to completion of the processing in step S1609 or step S1606, the application management unit 203 ends the processing. To prevent the notification of the same content to the user more than once, after the suggestion to the user in step S1603 or step S1607, the application management unit 203 may perform processing for deleting or invalidating the corresponding notification.

As described above, the exemplary embodiment in which whether a modified version of the application has been provided is checked in response to an error condition determination, and if a modified application has been released, a suggestion of update to the user is issued has been described.

A seventh exemplary embodiment will be described.

It is assumed that a user selects an application to be installed from a plurality of applications. In the selection, by referring to the information in the error report management unit 205 and recommending an application that stably operates in the user's environment, an error in the user's environment can be prevented. In the seventh exemplary embodiment, the application management unit 203 refers to the information in the error report management unit 205 and the terminal information management unit 206 to support the user's selection of an application to be installed.

Figure 17:
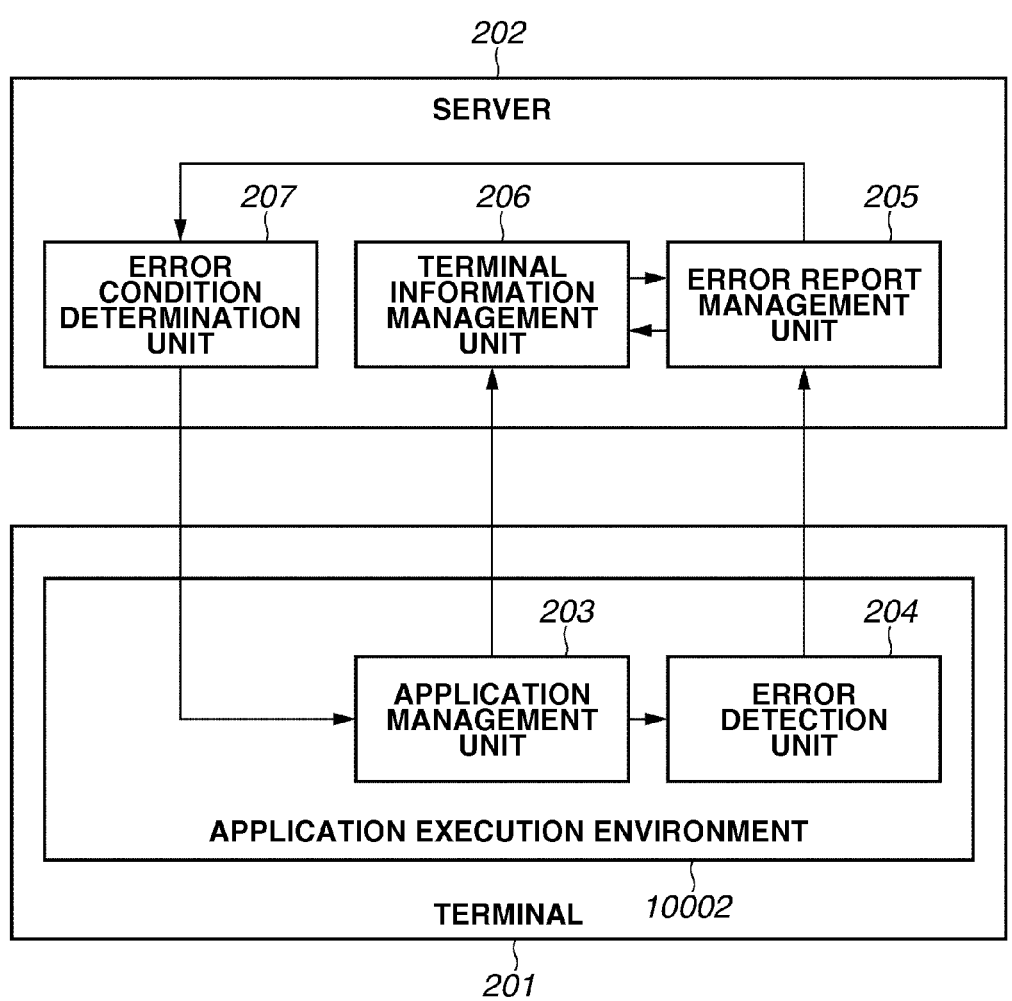
FIG. 17 is a block diagram illustrating functions of a server and a terminal according to a seventh exemplary embodiment.
Figure 18:
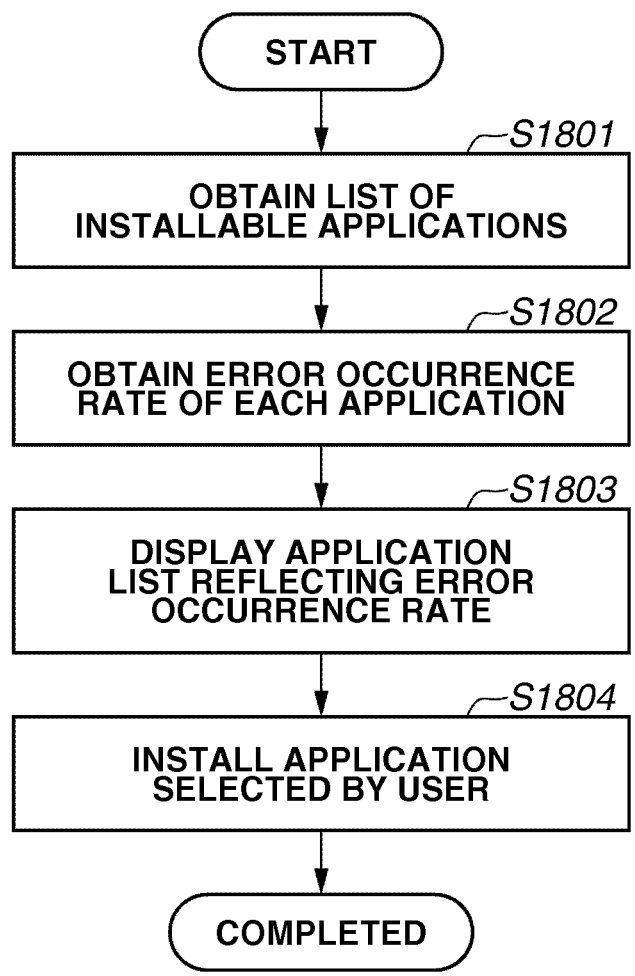
FIG. 18 is a flowchart illustrating a processing procedure of installation of an application according to the seventh exemplary embodiment.

With reference to FIGS. 17 and 18, operations of the application management unit 203 and the terminal information management unit 206 according to the seventh exemplary embodiment will be described. FIG. 17 is a block diagram illustrating functions provided to the server 202 and the terminal 201. The hardware configuration of the terminal 201 and the server 202 is similar to that illustrated in FIG. 1A. A difference from the functions illustrated in FIG. 2 is that the terminal information management unit 206 can use the information in the error report management unit 205. FIG. 18 is a flowchart illustrating an operation of the application management unit 203 to be performed when the user selects an application to be installed and performs the installation. The flowchart is implemented by the CPU executing the control program.

The user activates a viewer for displaying installable applications to start selection of an application to be installed. The viewer can be a connection client connected to the server S that manages the applications. In this exemplary embodiment, the application management unit 203 has a viewer function for the applications. In step S1801, from the server S managing the applications, the application management unit 203 obtains a list of applications that can be installed in the terminal 201 as an installation candidate list. It is to be noted that if all of the installable applications are included in the list, the size of the list becomes too large, and to solve the problem, to the selection of the applications to be included in the installation candidate list, the processing after step S1802 may be applied.

The application management unit 203 obtains the installation candidate list, and in step S1802, the application management unit 203 obtains, from the terminal information management unit 206, error occurrence rates of the applications in the installation candidate list at the time of execution in the same application execution environment as the application execution environment 10002. For the obtainment, the application management unit 203 sends, to the terminal information management unit, an inquiry including the install candidate list, the terminal model name of the terminal 201, and the terminal version.

The terminal information management unit 206 receives the inquiry, and refers to the information (the error report management table 601) obtained from the error report management unit 205, the terminal identification management table 2002, and the application execution state management table 2101. The terminal information management unit 206 sends a response including error occurrence rates of the individual applications in the install candidate list in the terminal model name and the terminal version of the terminal 201.

Alternatively, as in the fourth exemplary embodiment, the response may include the likelihood of an error due to combinations of applications. It is assumed that to reduce the load, the error report management unit 205 has cashed the determined error conditions due to combinations of applications with the other applications, and the error report management unit 205 can immediately respond an application causing an error to an application. The terminal information management unit 206 obtains a list of applications installed in the terminal 201 from the application installation state management table 2003 as an installed application list. The terminal information management unit 206 obtains, with respect to each application in the installed application list, from the error report management unit 205, an application that is an error condition. If the application that is the error condition is being included in the installed application list, the error report management unit 205 sends a response indicating that the corresponding application in the installation candidate list of the terminal 201 satisfies the error condition.

The application management unit 203 receives the response, and in step S1803, the application management unit 203 displays the application list reflecting the error occurrence rates. The reflection method includes, for example, a method of displaying applications by prioritizing applications having low execution error occurrence rates, and if a plurality of versions can be installed, a method of displaying applications by prioritizing versions having fewer errors. Alternatively, an icon of an application having a high error occurrence rate may be displayed with an effect as described in the processing in step S701. The user selects an application to be installed from the displayed applications, and in step S1804, the application management unit 203 performs the installation, and the processing ends.

In the exemplary embodiment, the application management unit 203 refers to the information in the error report management unit 205 and the terminal information management unit 206 to support the user's selection of an application.

An eighth exemplary embodiment will be described.

The error condition determination unit 207 may change a threshold for determining an error condition for each application. For example, in a case of an application developed by its own company, the error condition determination unit 207 determines that an error condition is satisfied when an error occurrence rate is 10% or more, and in a case of an application developed by another company, the error condition determination unit 207 determines that an error condition is satisfied when an error occurrence rate is 30% or more. In the eighth exemplary embodiment, the error condition determination unit 207 changes the method of determining an error condition depending on a developer of an application. The hardware configuration of the terminal 201 and the server 202 is similar to that illustrated in FIG. 1A.

Figure 19:
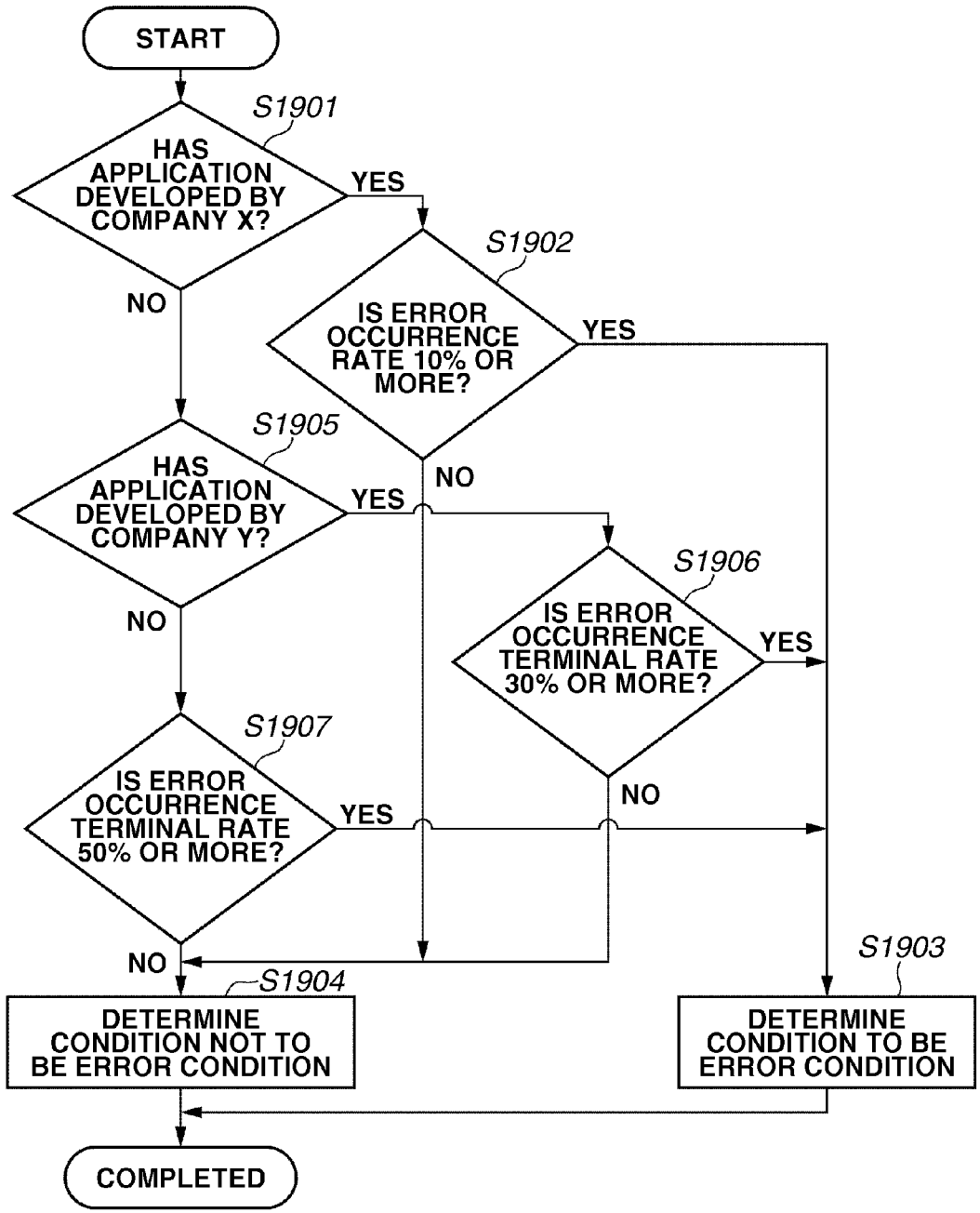
FIG. 19 is a flowchart illustrating a procedure of error condition determination processing according to an eighth exemplary embodiment.

With reference to FIG. 19, an operation of the error condition determination unit 207 according to the eighth exemplary embodiment is described. FIG. 19 is a flowchart illustrating processing of changing a determination condition with the error condition determination unit 207 depending on a developer of an application. The flowchart is implemented by the CPU executing the control program. It is assumed that, similarly to the sixth exemplary embodiment, the error condition determination unit 207 can obtain a developer of an application from the server S.

As described in steps S501 and S502, in the determination, the error condition determination unit 207 calculates an error occurrence rate of the application A for each terminal model. In the first exemplary embodiment, whether an application operating in a terminal model becomes an error condition is determined by determining whether an error occurrence rate is 50% or more, and the threshold of the error occurrence rate is fixed. In this exemplary embodiment, the threshold of the error occurrence rate to be used for the error condition determination is changed depending on the developer of the application.

Hereinafter, processing of changing the threshold of the error occurrence rate to be used for the error condition determination depending on the developer of the application by the error condition determination unit 207 will be described.

In step S1901, the error condition determination unit 207 checks whether the developer of the application A is a company X. If the developer is the company X (YES in step S1901), in step S1902, the error condition determination unit 207 determines whether the error occurrence rate is 10% or more. If the error occurrence rate is 10% or more (YES in step S1902), in step S1903, the error condition determination unit 207 determines that the application is an error condition. If the error occurrence rate is less than 10% (NO in step S1902), in step S1904, the error condition determination unit 207 determines that the application is not an error condition. In step S1901, if the error condition determination unit 207 determines that the developer of the application A is not the company X (NO in step S1901), in step S1905, the error condition determination unit 207 checks whether the developer is a company Y. If the developer is the company Y (YES in step S1905), in step S1906, the error condition determination unit 207 determines whether the error occurrence rate is 30% or more. If the error occurrence rate is 30% or more (YES in step S1906), in step S1903, the error condition determination unit 207 determines that the application is an error condition. If the error occurrence rate is less than 30% (NO in step S1906), in step S1904, the error condition determination unit 207 determines that the application is not an error condition. If the developer is not the company X or the company Y (NO in step S1901 and in step S1905), in step S1907, the error condition determination unit 207 determines whether the error occurrence rate is 50% or more. If the error occurrence rate is 50% or more (YES in step S1907), in step S1903, the error condition determination unit 207 determines that the application is an error condition. If the error occurrence rate is less than 50% (NO in step S1907), in step S1904, the error condition determination unit 207 determines that the application is not an error condition. In response to completion of the processing in step S1904 or step S1903, the error condition determination processing ends. The following processing is similar to that in step S503.

As described above, the exemplary embodiment in which the error condition determination unit 207 changes a determination criterion for an error condition depending on a developer of an application has been described.

A ninth exemplary embodiment will be described.

An error message to be sent from the error detection unit 204 to the error report management unit 205 may include personal information of the user of the terminal 201. For example, the information may include account information of the user. In the ninth exemplary embodiment, before an error report is sent, the user checks the content to be reported, and the user determines whether to report the content. The hardware configuration of the terminal 201 and the server 202 is similar to that illustrated in FIG. 1A.

Figure 24:
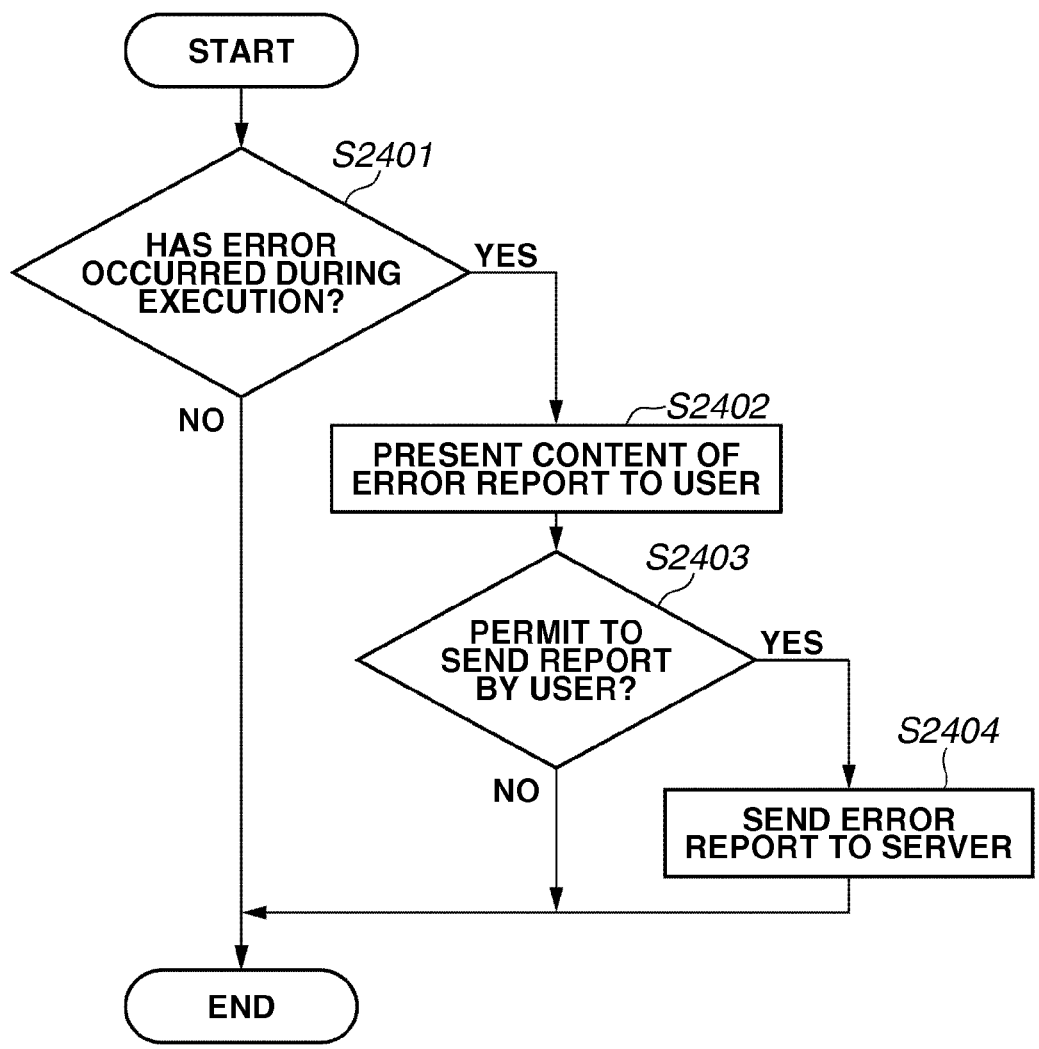
FIG. 24 is a flowchart illustrating a procedure of error detection and error report of an application according to a ninth exemplary embodiment.

With reference to FIG. 24, an operation of the error detection unit 204 according to the ninth exemplary embodiment is described. FIG. 24 is a flowchart illustrating processing to be performed by the error detection unit 204 when an error has occurred during the execution of the application. The flowchart is implemented by the CPU executing the control program.

In step S2401, similarly to the processing in step S401, the application execution environment 10002 detects with the error detection unit 204 an exception or an error that has occurred during the execution of the application. In response to occurrence of an error, the error detection unit 204 analyzes a program stack, and identifies the application that has made the error. Then, the error detection unit 204 generates an error report including the application identification information of the application that has made the error, the information of the program stack at the time of the occurrence of the error, and the terminal identification information.

In step S2402, the application execution environment 10002 presents the content of the generated error report to the user. The presentation methods include a method of displaying a dialog. If a dialog is provided, the display of the dialog includes a button for the user to instruct to permit or refuse the transmission. In step S2403, the error detection unit 204 determines whether the user has permitted by the pressed button on the dialog. If the user has permitted the transmission (YES in step S2403), similarly to the processing in step S402, in step S2404, the error detection unit 204 sends an error report to the server 202. If the user has not permitted the transmission (NO in step S2403), the error detection unit 204 does not send the error report and ends the processing.

In the ninth exemplary embodiment, before an error report is sent, the user checks the content to be reported, and the user determines whether to report the content.

A tenth exemplary embodiment will be described.

For example, it is assumed that in an application for face detection of an image, if the number of faces detected in the face detection is zero, it is determined that an error has occurred. If the image being processed at the time of the occurrence of the error can be included in an error message, and the developer can obtain the image, the developer can readily reproduce the error, and use the information for development of a modified version. In the tenth exemplary embodiment, data at the time of occurrence of an error is included in an error message.

With reference to FIG. 25, an operation of the error detection unit 204 according to the tenth exemplary embodiment will be described. FIG. 25 is a flowchart illustrating processing to be performed by the error detection unit 204 when an error has occurred during the execution of the application. The flowchart is implemented by the CPU executing the control program.

In step S2501, similarly to the processing in step S2401, the application execution environment 10002 detects with the error detection unit 204 an exception or an error that has occurred during the execution of the application. In response to occurrence of an error, the error detection unit 204 analyzes a program stack, and identifies the application that has made the error. Then, the error detection unit 204 generates an error report including the application identification information of the application that has made the error, the information of the program stack at the time of the occurrence of the error, and the terminal identification information.

In step S2502, the error detection unit 204 checks whether the application in which the error has occurred has opened an image file. It is assumed that the terminal 201 operates on Linux OS (registered trademark), and the application execution environment 10002 allocates a process to each application. In this case, the error detection unit 204 refers to a file descriptor in a process ID directory to identify the image file being opened in the application in which the error occurred.

If the application has opened an image file (YES in step S2502), the error detection unit 204 includes the image file in the error report. If the number of image files is large, only a file having the latest access time to the image file may be included in the error report.

If the application has not opened an image file (NO in step S2502), or if the processing in step S2503 has completed, in step S2504, similarly to the processing in step S2402, the error detection unit 204 presents the content of the error report to the user. In the dialog to be presented, items such as the error message of the error report and a thumbnail of the image file are classified and displayed, and a checkbox is provided to each item. In step S2505, the user selects the checkbox of each item to determine the content of the report.

In step S2506, from the content of the dialog input by the user, the error detection unit 204 determines whether the user has permitted the transmission. If the user has permitted the transmission (YES in step S2506), in step S2507, the error detection unit 204 includes only the item selected by the user in the error report, and sends the error report to the server 202. If the user has not permitted the transmission (NO in step S2506), the error detection unit 204 does not send the error report and ends the processing.

In the tenth exemplary embodiment, data being processed at the time of occurrence of an error is included in an error message.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Effect of the Invention

According to the exemplary embodiments of the present invention, execution of an application causing an error can be inhibited with limiting to terminals satisfying a condition causing the error in execution of the application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-197267 filed Sep. 7, 2012, which is hereby incorporated by reference herein in its entirety.

What is claimed is:

1. An information processing terminal being connected to an information processing apparatus via a network, the information processing terminal comprising:
   a reception unit configured to receive a condition that an application causes an error, the condition determined by the information processing apparatus on the basis of the error of another information processing terminal in which the application has been installed other than the information processing terminal; and
   a display control unit configured to change a display form of the application satisfying the condition for causing the error,
   wherein the error of the another information processing terminal other than the information processing terminal is determined by selecting the another information processing terminal from a plurality of information processing terminals connected to the information processing apparatus via the network according to installation information of the application and finding common terminal identification information between the information processing terminal and the another information processing terminal.

2. The information processing terminal according to claim 1, wherein the display control unit causes a message suggesting uninstallation to be displayed.

3. The information processing terminal according to claim 1, wherein the reception unit receives information including information indicating the existence of a modified version of the application satisfying the condition for causing the error, and
   wherein the display control unit causes a message suggesting update to the modified version of the application to be displayed.

4. An information processing terminal being connected to an information processing apparatus via a network, the information processing terminal comprising:
   a reception unit configured to receive a condition that an application causes an error, the condition determined by the information processing apparatus on the basis of the error of another information processing terminal in which the application has been installed other than the information processing terminal; and a display control unit configured to, in response to reception of an instruction for activating the application satisfying the condition for causing the error, wherein the error of the another information processing terminal other than the information processing terminal is determined by selecting the another information processing terminal from a plurality of information processing terminals connected to the information processing apparatus via the network according to installation information of the application and finding common terminal identification information between the information processing terminal and the another information processing terminal.

5. The information processing terminal according to claim 4, wherein the display control unit causes a message suggesting uninstallation to be displayed.

6. The information processing terminal according to claim 4, wherein the reception unit receives information including information indicating the existence of a modified version of the application satisfying the condition for causing the error, and wherein the display control unit causes a message suggesting update to the modified version of the application to be displayed.

7. An information processing terminal being connected to an information processing apparatus via a network, the information processing terminal comprising:

a storage unit configured to store installation information of applications that have been installed in the own terminal;

a reception unit configured to receive, from the information processing apparatus, error information of the applications and information about a plurality of information processing terminals in which the applications have been installed;

a determination unit configured to, based on the error information, the information about the plurality of information processing terminals other than the information processing terminal, and the installation information of the applications, determine a condition that the applications cause an error; and a display control unit configured to change, out of the applications, a display form of the application satisfying the condition for causing the error, wherein the condition that the applications cause an error is determined by selecting another information processing terminal from a plurality of information processing terminals connected to the information processing apparatus via the network according to the installation information and finding common terminal identification information between the information processing terminal and the another information processing terminal.

8. An information processing terminal being connected to an information processing apparatus via a network, the information processing terminal comprising:

a storage unit configured to store installation information of applications that have been installed in the own terminal;

a reception unit configured to receive, from the information processing apparatus, error information of the applications and information about a plurality of information processing terminals in which the applications have been installed;

a determination unit configured to, based on the error information, the information about the plurality of information processing terminals other than the information processing terminal, and the installation information of the applications, determine a condition that the applications cause an error; and a display control unit configured to, in response to reception of an instruction for activating an application satisfying the condition for causing the error out of the applications, wherein the condition that the applications cause an error is determined by selecting another information processing terminal from a plurality of information processing terminals connected to the information processing apparatus via the network according to the installation information and finding common terminal identification information between the information processing terminal and the another information processing terminals.

9. A method performed by a system including an information processing apparatus to which a plurality of information processing terminals are connected via a network, the method comprising:

storing information about the information processing terminals, and information of an application installed in the information processing terminals;

receiving error information of the applications in the information processing terminals;

determining a condition that the application causes an error, based on the error information, the information about the information processing terminals other than the information processing terminal, and the installation information of the application;

specifying, out of the plurality of information processing terminals, the information processing terminals satisfying the condition that the installed application causes the error; and performing display control by changing a display form of an icon of the application, wherein the condition that the applications cause an error is determined by selecting another information processing terminal from the plurality of information processing terminals connected to the information processing apparatus via the network according to the installation information and finding common terminal identification information between the information processing terminal and the another information processing terminals.

10. A method performed by a system including an information processing apparatus to which a plurality of information processing terminals are connected via a network, the method comprising:

storing information about the information processing terminals, and information of applications installed in the information processing terminals;

receiving error information of the applications in the information processing terminals;

determining a condition that the application causes an error, based on the error information, the information about the information processing terminals other than the information processing terminal, and the installation information of the applications;

specifying, out of the plurality of information processing terminals, the information processing terminals satisfying the condition that the installed application causes the error; and performing display control by displaying a message based on a fact that the condition for causing the error is satisfied if the application has been installed in the specified information processing terminals, wherein the condition that the applications cause an error is determined by selecting another information processing terminal from the plurality of information processing terminals connected to the information processing apparatus via the network according to the installation information and finding common terminal identification information between the information processing terminal and the plurality of information processing terminals.

11. A method of controlling an information processing terminal being connected to an information processing apparatus via a network, the method comprising:

receiving a condition that an application causes an error, the condition being determined by the information processing apparatus on the basis of the error of another information processing terminal other than the information processing terminal; and performing display control by changing a display form of the application satisfying the condition for causing the error, wherein the error of the another information processing terminal other than the information processing terminal is determined by selecting the another information processing terminal from a plurality of information processing terminals connected to the information processing apparatus via the network according to installation information and finding common terminal identification information between the information processing terminal and the another information processing terminal.

12. A non-transitory computer-readable storage medium holding a program causing a computer to perform the respective steps of the method according to claim 11.

13. A method of controlling an information processing terminal being connected to an information processing apparatus via a network, the method comprising:

receiving a condition that an application causes an error, the condition being determined by the information processing apparatus on the basis of the error of another information processing terminal other than the information processing terminal; and performing display control by displaying a message based on a fact that the condition for causing the error is satisfied, wherein the error of the another information processing terminal other than the information processing terminal is determined by selecting the another information processing terminal from a plurality of information processing terminals connected to the information processing apparatus via the network according to installation information and finding common terminal identification information between the information processing terminal and the another information processing terminal.

14. A non-transitory computer-readable storage medium holding a program causing a computer to perform the respective steps of the method according to claim 13.

15. A method of controlling an information processing terminal being connected to an information processing apparatus via a network, the method comprising:

storing in a storage unit information of applications that have been installed in the own terminal;

receiving, from the information processing apparatus, error information of the applications and information about a plurality of information processing terminals in which the applications have been installed;

determining a condition that the applications cause an error, based on the error information, the information about the plurality of information processing terminals other than the information processing terminal, and the information of the applications; and performing display control by changing, out of the applications, a display form of the application satisfying the condition for causing the error, wherein the condition that the applications cause an error is determined by selecting another information processing terminal from a plurality of information processing terminals connected to the information processing apparatus via the network according to the installation information and finding common terminal identification information between the information processing terminal and the another information processing terminal.

16. A non-transitory computer-readable storage medium holding a program causing a computer to perform the respective steps of the method according to claim 15.

17. A method of controlling an information processing terminal being connected to an information processing apparatus via a network, the method comprising:

storing in a storage unit information of applications that have been installed in the own terminal;

receiving, from the information processing apparatus, error information of the applications and information about a plurality of information processing terminals in which the applications have been installed;

determining a condition that the applications causes an error based on the error information, the information about the plurality of information processing terminals other than the information processing terminal, and the information of the applications; and performing display control by displaying a message based on a fact that the condition for causing the error is satisfied, wherein the condition that the applications cause an error is determined by selecting another information processing terminal from a plurality of information processing terminals connected to the information processing apparatus via the network according to installation information and finding common terminal identification information between the information processing terminal and the another information processing terminal.

18. A non-transitory computer-readable storage medium holding a program causing a computer to perform the respective steps of the method according to claim 17.

* * * * *